(12) United States Patent
McCullough

(10) Patent No.: US 12,439,326 B2
(45) Date of Patent: Oct. 7, 2025

(54) CLIENT ASSISTED OFF-CHANNEL SCAN

(71) Applicant: Charter Communications Operating, LLC, St. Louis, MO (US)

(72) Inventor: Taren McCullough, St. Louis Park, MN (US)

(73) Assignee: Charter Communications Operating, LLC, St. Louis, MO (US)

( * ) Notice: Subject to any disclaimer, the term of this patent is extended or adjusted under 35 U.S.C. 154(b) by 503 days.

(21) Appl. No.: 17/891,512

(22) Filed: Aug. 19, 2022

(65) Prior Publication Data
US 2024/0064619 A1    Feb. 22, 2024

(51) Int. Cl.
*H04W 48/16*    (2009.01)
*H04W 24/10*    (2009.01)

(52) U.S. Cl.
CPC .......... *H04W 48/16* (2013.01); *H04W 24/10* (2013.01)

(58) Field of Classification Search
CPC ...... H04W 24/10; H04W 48/16; H04W 48/20
See application file for complete search history.

(56) References Cited

U.S. PATENT DOCUMENTS

| | | | | |
|---|---|---|---|---|
| 7,801,546 B2 * | 9/2010 | Yang | ...................... | H04W 52/50 455/67.11 |
| 7,848,286 B2 * | 12/2010 | Zhen | ...................... | H04W 72/56 370/328 |
| 8,743,727 B2 * | 6/2014 | Selvam | ...................... | G01S 5/14 370/252 |
| 9,357,492 B2 * | 5/2016 | Malik | ............... | H04W 52/0254 |
| 9,622,161 B1 * | 4/2017 | Law | ...................... | H04L 69/325 |
| 9,648,615 B2 * | 5/2017 | Joshi | ...................... | H04W 4/029 |
| 9,801,123 B2 * | 10/2017 | Law | ...................... | H04W 24/08 |
| 9,877,251 B2 * | 1/2018 | Stager | ............... | H04W 36/0085 |
| 9,955,359 B2 * | 4/2018 | Monaghan | ............ | H04W 4/025 |
| 9,973,935 B2 * | 5/2018 | Garg | ...................... | H04W 16/10 |
| 10,028,156 B2 * | 7/2018 | HomChaudhuri | .... | H04W 24/08 |
| 10,038,995 B2 * | 7/2018 | Katar | ............... | H04W 36/00835 |
| 10,165,598 B2 * | 12/2018 | Patwardhan | ........ | H04W 74/004 |
| 10,251,121 B2 * | 4/2019 | Bustani | ................... | H04W 48/16 |
| 10,356,629 B2 * | 7/2019 | Gokturk | ................. | H04L 12/403 |
| 10,368,303 B1 * | 7/2019 | Law | ...................... | H04W 48/16 |
| 10,470,082 B2 * | 11/2019 | Rengarajan | ........... | H04W 84/18 |

(Continued)

FOREIGN PATENT DOCUMENTS

| | | | | |
|---|---|---|---|---|
| CA | 3121652 A1 * | 12/2021 | ............. | H04W 28/02 |
| CN | 107925926 A * | 4/2018 | ........... | H04B 17/318 |

(Continued)

*Primary Examiner* — Eric Nowlin
(74) *Attorney, Agent, or Firm* — Young Basile Hanlon & MacFarlane, P.C.

(57) ABSTRACT

Methods and systems for using client assisted off-channel scanning. A method includes determining, by an access point, whether the access point or station performs an off-channel scan, selecting, by the access point, a station for each operating frequency supported by the access point when the access point is unable to perform the off-channel scan, sending, by the access point to each selected station, an off-channel scan request with a channel list, receiving, by the access point from each selected station, off-channel scan data, and selecting, by the access point, a serving channel for each operating frequency based on the off-channel scan data.

19 Claims, 19 Drawing Sheets

(56) References Cited

U.S. PATENT DOCUMENTS

| | | | | |
|---|---|---|---|---|
| 10,638,325 B2* | 4/2020 | Garg | H04W 16/10 |
| 10,708,126 B2* | 7/2020 | Singla | H04W 24/08 |
| 10,757,608 B2* | 8/2020 | Sundaram | H04W 28/24 |
| 10,820,261 B1* | 10/2020 | Law | H04W 72/541 |
| 10,959,148 B2* | 3/2021 | Strater | H04W 36/302 |
| 11,012,912 B2* | 5/2021 | Watson | H04B 17/318 |
| 11,032,722 B2* | 6/2021 | Jin | H04W 72/542 |
| 11,129,043 B2* | 9/2021 | Rengaraju | H04B 17/336 |
| 11,197,242 B2* | 12/2021 | Monajemi | H04W 72/20 |
| 11,245,590 B1* | 2/2022 | Henry | H04W 4/021 |
| 11,259,188 B2* | 2/2022 | Harrod | H04W 72/0453 |
| 11,310,106 B2* | 4/2022 | Singla | H04W 24/08 |
| 11,375,398 B2* | 6/2022 | Chandra | H04W 28/04 |
| 11,445,423 B2* | 9/2022 | Desai | H04W 36/302 |
| 11,477,720 B2* | 10/2022 | Doyle | H04W 40/244 |
| 11,483,761 B2* | 10/2022 | Zhou | H04W 48/16 |
| 11,528,614 B2* | 12/2022 | Garg | H04W 16/10 |
| 11,540,194 B2* | 12/2022 | Strater | H04B 17/318 |
| 11,553,390 B2* | 1/2023 | Smith | H04L 1/1621 |
| 11,825,372 B2* | 11/2023 | Desai | H04L 41/0661 |
| 11,881,991 B2* | 1/2024 | Singla | H04W 24/08 |
| 11,889,542 B2* | 1/2024 | Huotari | H04L 5/0091 |
| 11,895,551 B2* | 2/2024 | Strater | H04W 48/20 |
| 12,289,630 B2* | 4/2025 | Gopalakrishnan | H04W 8/005 |
| 2005/0245269 A1 | 11/2005 | Demirhan | H04W 24/00 455/450 |
| 2007/0072638 A1* | 3/2007 | Yang | H04W 52/50 455/522 |
| 2007/0115877 A1* | 5/2007 | Zhen | H04W 72/56 370/329 |
| 2008/0102852 A1* | 5/2008 | Du | H04W 48/20 455/453 |
| 2010/0169919 A1* | 7/2010 | Du Breuil | H04N 21/4345 725/39 |
| 2010/0248715 A1* | 9/2010 | Lundsgaard | H04W 48/16 455/434 |
| 2013/0308618 A1* | 11/2013 | Panneerselvam | G01S 5/14 370/338 |
| 2014/0148155 A1* | 5/2014 | Batta | H04B 7/0617 455/432.1 |
| 2014/0192726 A1* | 7/2014 | Jain | H04W 74/08 370/329 |
| 2015/0036573 A1* | 2/2015 | Malik | G08C 17/02 370/311 |
| 2015/0264614 A1* | 9/2015 | Stager | H04W 36/0085 370/332 |
| 2016/0087897 A1* | 3/2016 | Hardt | H04L 47/122 370/237 |
| 2016/0157225 A1* | 6/2016 | Joshi | H04W 4/02 370/329 |
| 2016/0192203 A1* | 6/2016 | Gokturk | H04L 41/0823 370/254 |
| 2016/0345163 A1* | 11/2016 | Monaghan | H04W 4/029 |
| 2017/0006452 A1* | 1/2017 | Ponnuswamy | H04W 24/08 |
| 2017/0013493 A1* | 1/2017 | HomChaudhuri | H04W 36/08 |
| 2017/0026845 A1* | 1/2017 | Garg | H04W 16/10 |
| 2017/0055200 A1* | 2/2017 | Hassan | H04W 48/08 |
| 2017/0064536 A1* | 3/2017 | Katar | H04W 8/02 |
| 2017/0118698 A1* | 4/2017 | Law | H04L 69/324 |
| 2017/0118699 A1* | 4/2017 | Law | H04W 28/02 |
| 2017/0272317 A1* | 9/2017 | Singla | H04W 24/08 |
| 2017/0272977 A1* | 9/2017 | Rengarajan | H04W 40/22 |
| 2018/0098270 A1* | 4/2018 | Bustani | H04W 48/16 |
| 2018/0167975 A1* | 6/2018 | Patwardhan | H04W 74/004 |
| 2018/0213424 A1* | 7/2018 | Du | H04W 24/00 |
| 2018/0295520 A1* | 10/2018 | Garg | H04W 16/10 |
| 2018/0352493 A1* | 12/2018 | Strater | H04W 36/0085 |
| 2019/0082382 A1* | 3/2019 | HomChaudhuri | H04W 52/0225 |
| 2019/0373507 A1* | 12/2019 | Chen | H04W 48/20 |
| 2020/0021996 A1* | 1/2020 | Harrod | H04W 16/10 |
| 2020/0100144 A1* | 3/2020 | Sundaram | H04W 72/542 |
| 2020/0229086 A1* | 7/2020 | Monajemi | H04W 72/20 |
| 2020/0275283 A1* | 8/2020 | Garg | H04W 16/10 |
| 2020/0322216 A1* | 10/2020 | Singla | H04L 41/0806 |
| 2020/0359290 A1* | 11/2020 | Watson | H04W 36/304 |
| 2021/0068014 A1* | 3/2021 | Siraj | H04W 36/0088 |
| 2021/0076294 A1* | 3/2021 | Doyle | H04W 56/007 |
| 2021/0144584 A1* | 5/2021 | Chandra | H04W 76/15 |
| 2021/0160722 A1* | 5/2021 | Rengaraju | H04W 24/10 |
| 2021/0168686 A1* | 6/2021 | Strater | H04W 36/302 |
| 2021/0185597 A1* | 6/2021 | Chitrakar | H04W 52/0241 |
| 2021/0377839 A1* | 12/2021 | Desai | H04L 43/0876 |
| 2021/0385733 A1* | 12/2021 | Zerumsky | H04W 28/02 |
| 2022/0045909 A1* | 2/2022 | Henry | H04W 48/16 |
| 2022/0201596 A1* | 6/2022 | Zhou | H04W 48/16 |
| 2022/0225200 A1* | 7/2022 | Smith | H04L 1/1614 |
| 2022/0255799 A1* | 8/2022 | Singla | H04L 41/12 |
| 2022/0338109 A1* | 10/2022 | Cherian | H04W 48/08 |
| 2022/0377639 A1* | 11/2022 | Desai | H04W 36/302 |
| 2023/0029256 A1* | 1/2023 | Huotari | H04L 5/0062 |
| 2023/0051896 A1* | 2/2023 | Strater | H04W 72/542 |
| 2023/0127459 A1* | 4/2023 | Strater | H04W 36/0085 370/331 |
| 2023/0247092 A1* | 8/2023 | Ajami | H04L 67/1078 709/238 |
| 2023/0319691 A1* | 10/2023 | HomChaudhuri | H04W 24/02 370/328 |
| 2023/0362698 A1* | 11/2023 | Gopalakrishnan | H04W 48/20 |
| 2023/0362797 A1* | 11/2023 | Gopalakrishnan | H04W 24/10 |
| 2024/0064619 A1* | 2/2024 | McCullough | H04W 24/10 |
| 2024/0107570 A1* | 3/2024 | Huotari | H04W 48/12 |
| 2024/0171456 A1* | 5/2024 | Singla | H04L 41/12 |
| 2024/0365213 A1* | 10/2024 | Desai | H04W 48/16 |

FOREIGN PATENT DOCUMENTS

| | | | | |
|---|---|---|---|---|
| EP | 1929655 B1 * | 8/2018 | | H04W 52/50 |
| EP | 3430831 B1 * | 2/2021 | | H04L 41/12 |
| EP | 3923675 A1 * | 12/2021 | | H04W 28/02 |
| TW | I265684 B * | 11/2006 | | |
| WO | WO-2007040669 A2 * | 4/2007 | | H04W 52/50 |
| WO | WO-2013173163 A1 * | 11/2013 | | G01S 13/876 |
| WO | WO-2014085130 A2 * | 6/2014 | | H04W 16/28 |
| WO | WO-2015138404 A1 * | 9/2015 | | H04W 36/00835 |
| WO | WO-2016089454 A1 * | 6/2016 | | H04W 4/02 |
| WO | WO-2017039810 A1 * | 3/2017 | | H04B 17/318 |
| WO | WO-2017070099 A1 * | 4/2017 | | H04W 28/02 |
| WO | WO-2017161225 A1 * | 9/2017 | | H04L 41/12 |
| WO | WO-2018063689 A1 * | 4/2018 | | H04W 24/08 |
| WO | WO-2018156286 A1 * | 8/2018 | | H04B 17/318 |
| WO | WO-2018172108 A1 * | 9/2018 | | A61B 5/00 |
| WO | WO-2018213646 A1 * | 11/2018 | | H04B 17/318 |
| WO | WO-2021243348 A1 * | 12/2021 | | H04W 24/04 |
| WO | WO-2022031494 A1 * | 2/2022 | | H04W 24/02 |
| WO | WO-2022077826 A1 * | 4/2022 | | H04W 24/02 |
| WO | WO-2022150198 A1 * | 7/2022 | | H04W 36/22 |
| WO | WO-2023018459 A1 * | 2/2023 | | H04W 36/0055 |
| WO | WO-2023150476 A1 * | 8/2023 | | H04L 5/0053 |

* cited by examiner

```
channel_list = {
    "2G": [1,2,3,4,5,6,7,8,9,10,11],                                                              # Full 2.4GHz Channel List
    "5G": [36,40,44,48,52,56,60,64,100,104,108,112,116,120,124,128,132,136,140,144,
           149,153,157,161,165,169,173,177,181],                                                  # Full 5GHz Channel List
    "6G": [1,5,9,13,17,21,25,29,33,37,41,45,49,53,57,61,65,69,73,77,81,85,89,93,97,
           101,105,109,113,117,121,125,129,133,137,141,145,149,153,157,161,165,
           169,173,177,181,185,189,193,197,201,205,209,213,217,221,225,229,233]                   # Full 6GHz Channel List
}
```

FIG. 8

```
channel_report = {
  "band": "2G"                                            # which operating frequency the report is on
  "channel": 1                                            # which channel the report is on
  "unique_ssid_count": 5                                  # how many unique SSIDs were observed
  "unique_bssid_count": 8                                 # how many unique BSSIDs were observed
  "unique_ssids": ["Ex_SSID_1","Ex_SSID_2","Ex_SSID_3"]   # list the unique ssids observed
  "unique_bssids": ["Ex_BSSID_1","Ex_BSSID_2","Ex_BSSID_3"] # list the unique bssids observed
  "sta_count": [8,5,3]                                    # list the station count associated to each ssid in the unique_ssid list
  "channel_utilization": [165,85,40]                      # list the channel utilizations of each ssid in the unique_ssid list
  "available_admission_capacity": [15105,7802,3468]       # list the available admission capacity of each ssid in the unique_ssid list
}
```

FIG. 9

CLIENT ASSISTED OFF-CHANNEL SCAN

TECHNICAL FIELD

This disclosure relates to wireless communications. More specifically, this disclosure relates to performing off-channel scans using stations for defined access point operability.

BACKGROUND

Access Points (APs) are used in a variety of settings or premises including, but not limited to, residences, enterprises, stadiums, and/or offices, to provide Internet, intranet, and/or network access to stations (STAs), mobile devices, laptops, smartphones, smart televisions, desktops, and/or other devices. APs can provide access using wired or wireless techniques.

APs communicate to STAs, for example, on pre-defined channels, or slices of spectrum approved by the Federal Communications Commission (FCC). In some cases, certain channels can become over-utilized and APs operating on that channel can have decreased performance due to interference. To mitigate against over-utilization and interference, APs can perform an off-channel scan (OCS) to survey the spectrum in search for cleaner channels to operate on. APs can perform two types of OCS, passive OCSs and/or active OCSs. For a passive OCS, the AP can tune its radio to each channel it intends to scan and passively listen for beacons to determine network utilization. For active OCS, the AP can tune its radio to each channel it intends to scan and send a probe to solicit probe responses from APs operating on the specified channel. The probe responses can be used to determine network utilization. The OCS report can provide a variety of information including, but not limited to, the number of APs operating on a specific channel and the interference on the specific channel. The interval time between OCSs can be manipulated in times of high traffic load or critical traffic delivery.

Performing a OCS means that the AP has to switch from a client or device serving channel to one or more other channels to determine which channel provides best or optimal performance with respect to the other channels. Therefore, for a period of time, the AP is not available to serve the device. Moreover, at certain times, the OCS can be turned off due to device activity. Consequently, the AP is performing under suboptimal channel conditions. These factors can decrease the overall ecosystem performance.

SUMMARY

Disclosed herein are methods and systems for using client assisted off-channel scanning.

In some implementations, a method includes determining, by an access point, whether the access point or station performs an off-channel scan, selecting, by the access point, a station for each operating frequency supported by the access point when the access point is unable to perform the off-channel scan, sending, by the access point to each selected station, an off-channel scan request with a channel list, receiving, by the access point from each selected station, off-channel scan data, and selecting, by the access point, a serving channel for each operating frequency based on the off-channel scan data.

In some implementations, an access point includes at least one radio, a memory, and a processor operating with the at least one radio and the memory. The processor configured to identify which connected devices support which access point operating frequency, for each access point operating frequency, determine a least utilized connected device from the identified connected devices, for each access point operating frequency, request each determined connected device to perform an off-channel scan using a defined set of channels, and for each access point operating frequency, determine whether to switch from a current device serving channel to a scanned channel based on off-channel scan results sent by each determined connected device.

In some implementations, a method includes determining, by an access device, to offload performance of an off-channel scan when an operational metric of the access device meets or exceeds a defined threshold, collecting, by the access device, which client devices support operational frequencies configured on the access device, determining, by the access device, from the collected client devices, a least unoccupied client device for each operational frequency configured on the access device, requesting, by the access device, each least unoccupied client device to perform the off-channel scan using a channel list, and using, by the access device, off-channel scan results from each least unoccupied client device to determine whether to, for each operational frequency, switch from a current operational channel to a scanned channel.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 8 is an example diagram of a channel list in accordance with embodiments of this disclosure.

FIG. 9 is an example diagram of a channel report in accordance with embodiments of this disclosure.

DETAILED DESCRIPTION

Figure 1A:
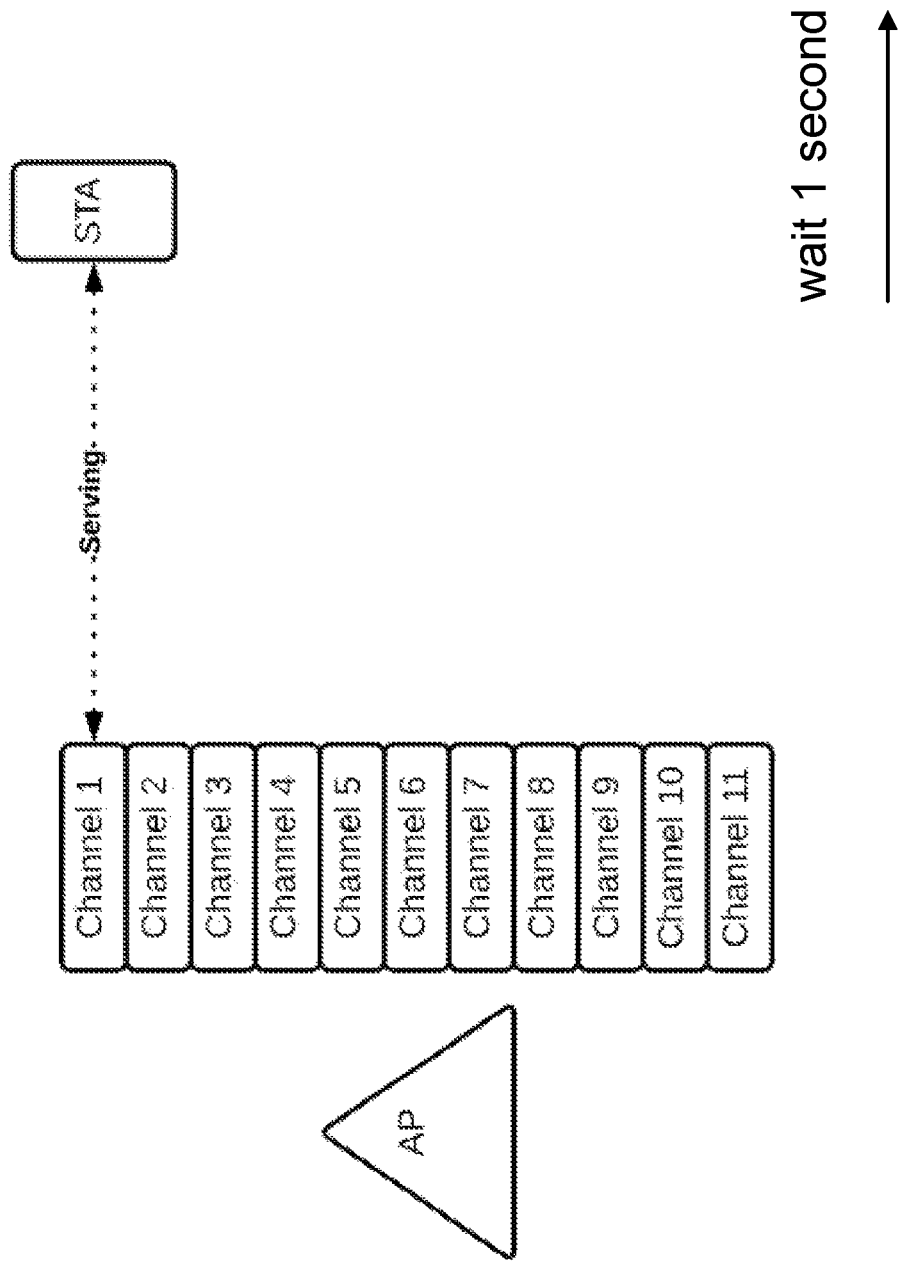
FIGS. 1A-1E are diagrams of passive off-channel scanning.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system or platform" includes any unit, or combination of units, capable of performing any method, or any portion or portions thereof, disclosed herein. For example, the "server", "computer", "computing device or platform", or "cloud computing system or platform" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1B:
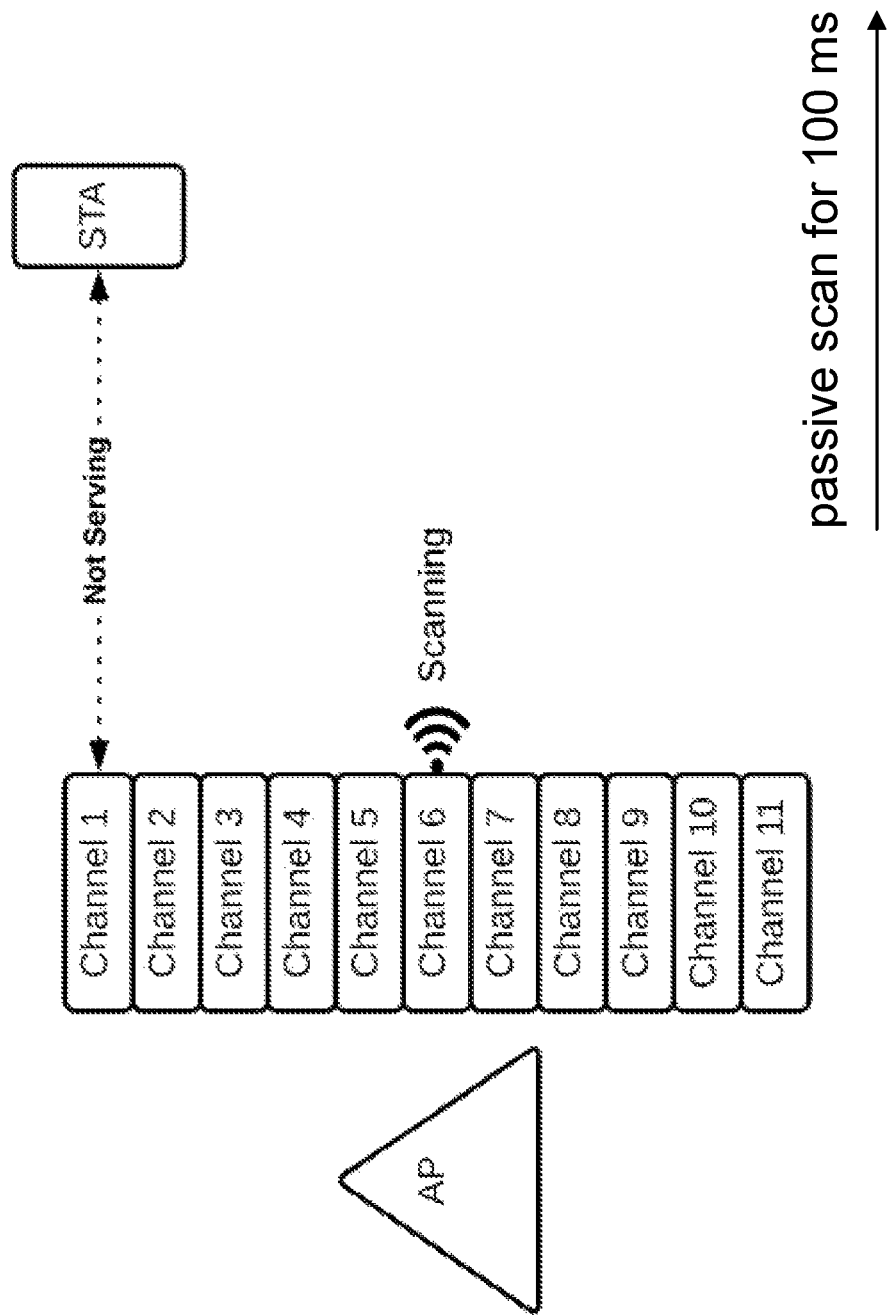
Figure 1C:
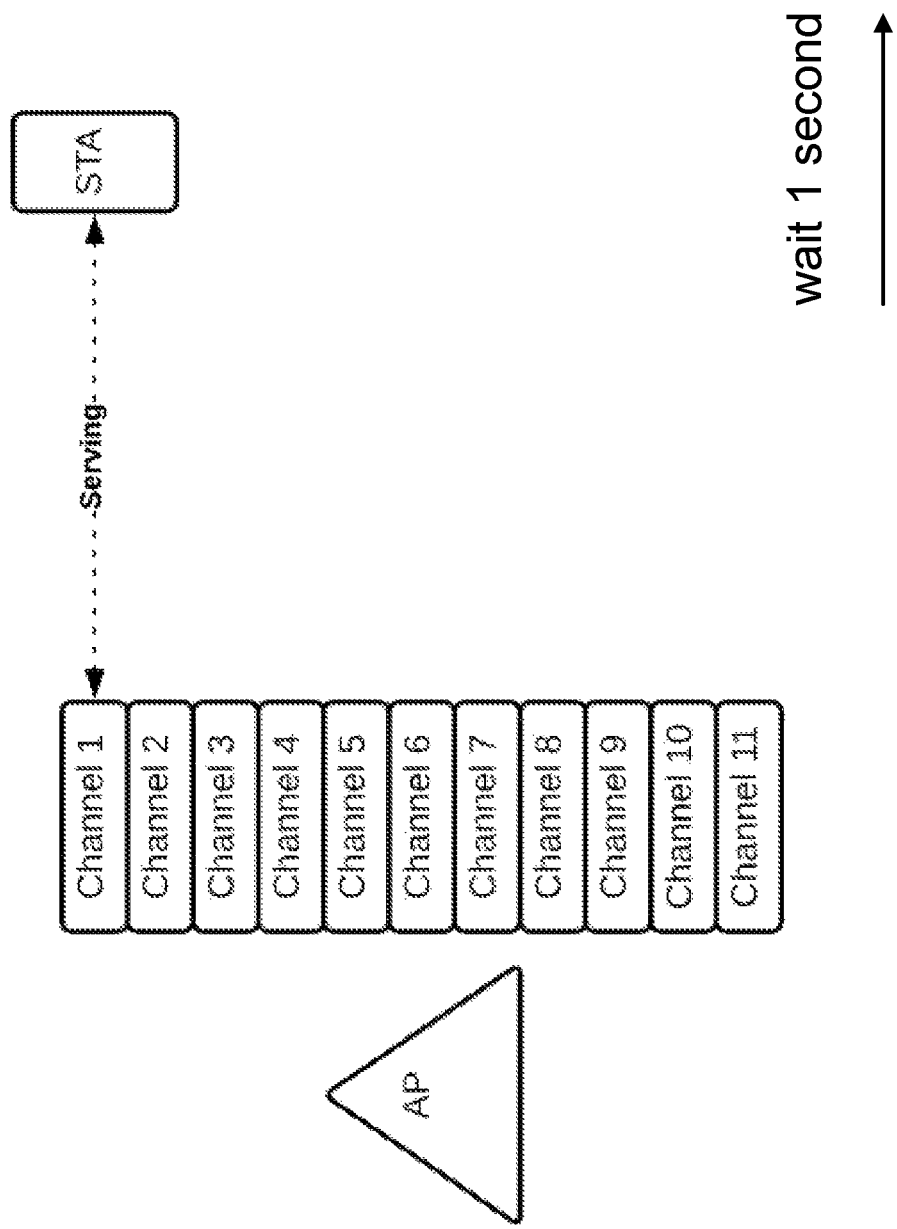
Figure 1D:
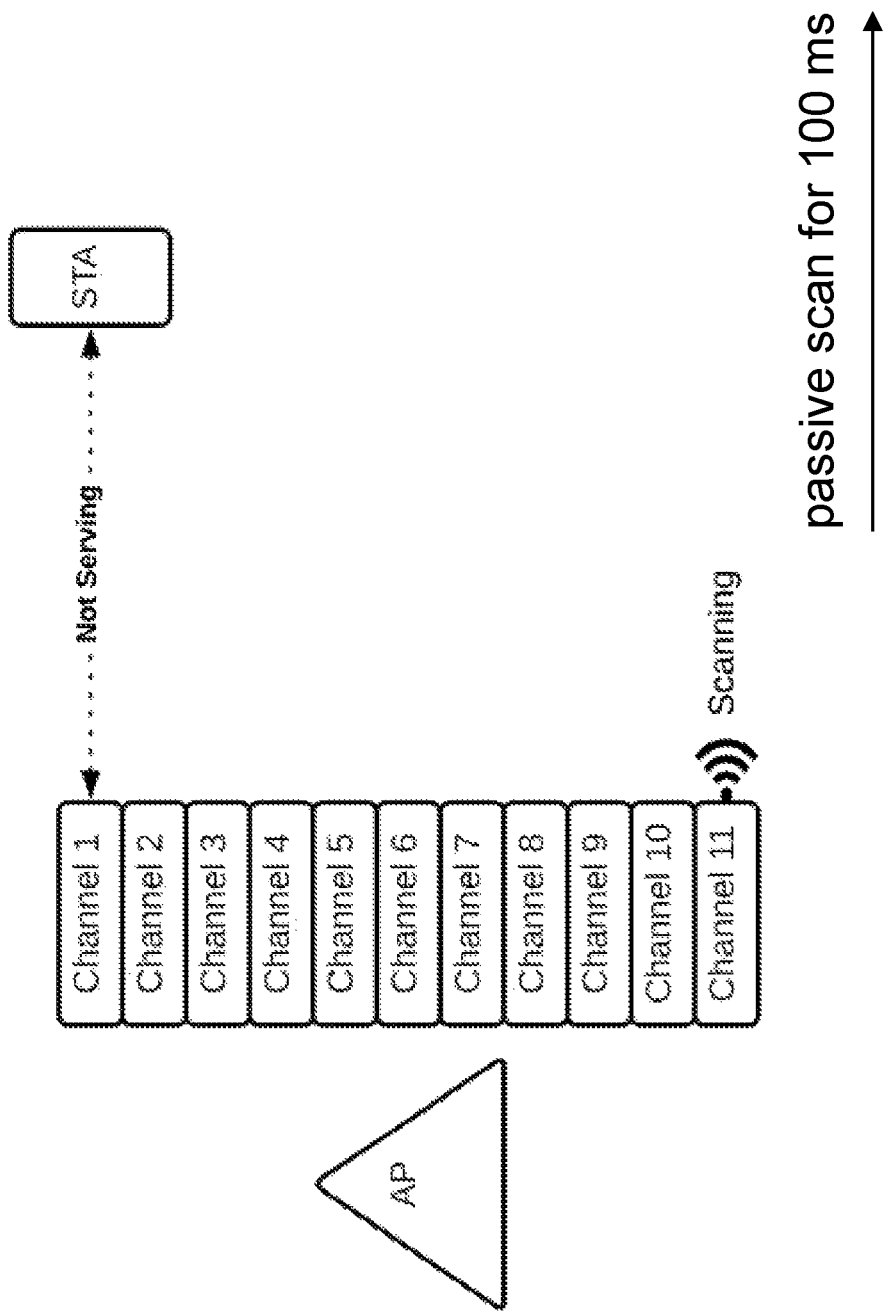
Figure 1E:
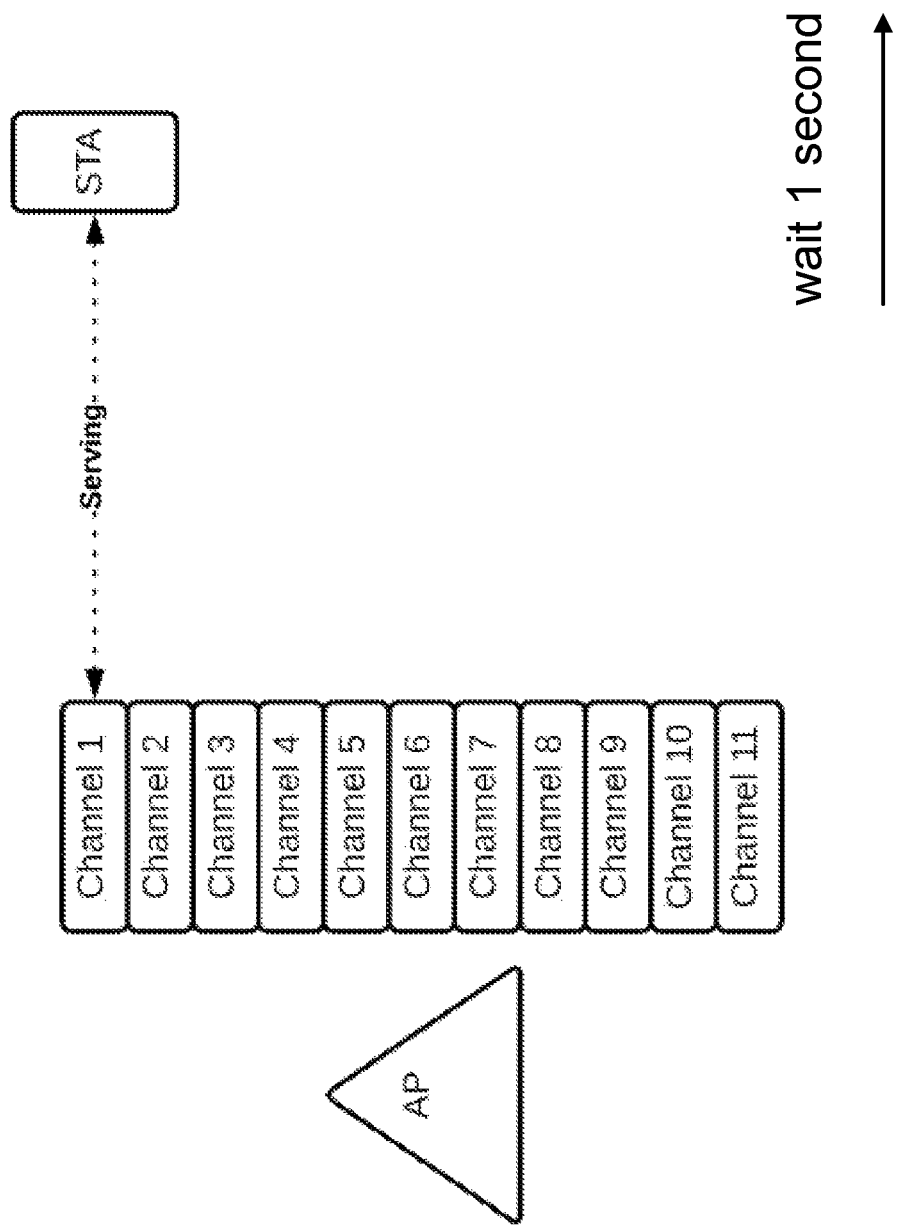

FIGS. 1A-1E are diagrams of passive off-channel scanning. In FIG. 1A, the AP is serving the STA on channel 1. After a defined period of time, for example 1 second, the AP switches to a different channel, for example channel 6 as shown in FIG. 1B, to passively scan for beacons from other APs on that channel. This can take a defined interval of item, for example 100 milliseconds (100 ms). During the scan time, the AP is not serving the STA on channel 1. After the 100 ms, the AP switches back to the active or serving channel, i.e., to channel 1 as shown in FIG. 1C. After waiting for 1 second, the AP switches to another channel, for example channel 11 as shown in FIG. 1D, to passively scan for beacons from other APs on that channel. After the 100 ms, the AP switches back to the active or serving channel, i.e., to channel 1 as shown in FIG. 1E. This continues until all of the channels in a channel list are scanned.

Figure 2A:
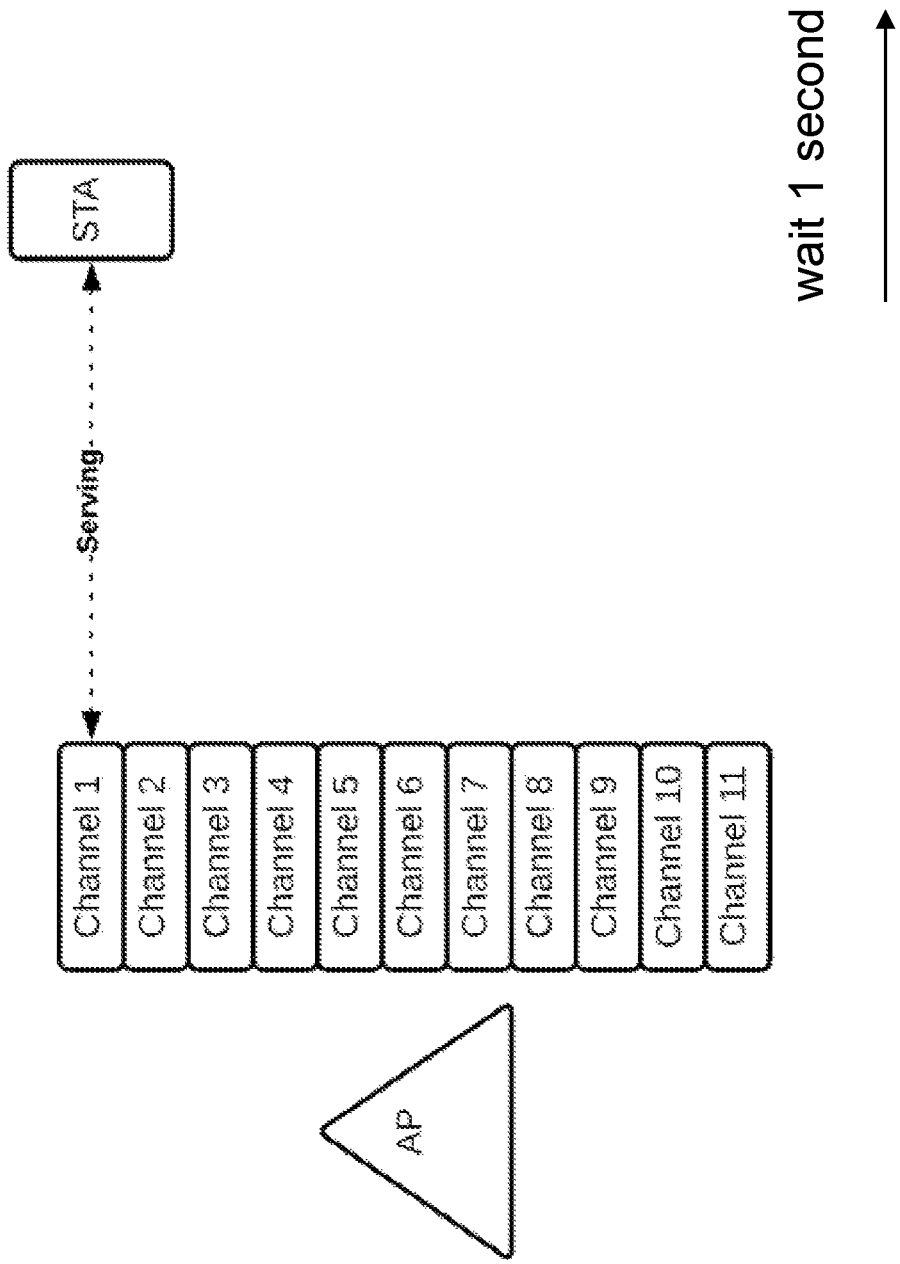
FIGS. 2A-2E are diagrams of active off-channel scanning.
Figure 2B:
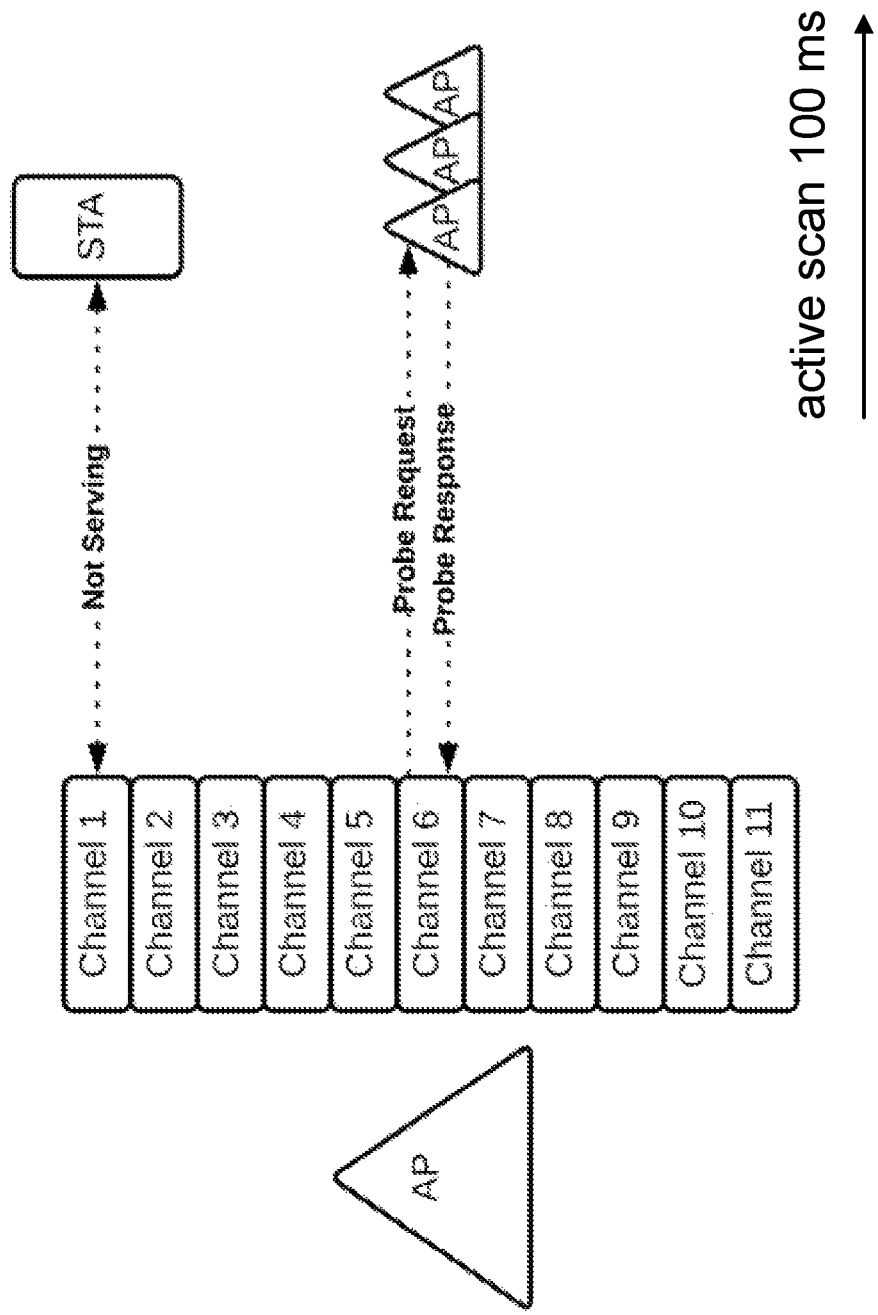
Figure 2C:
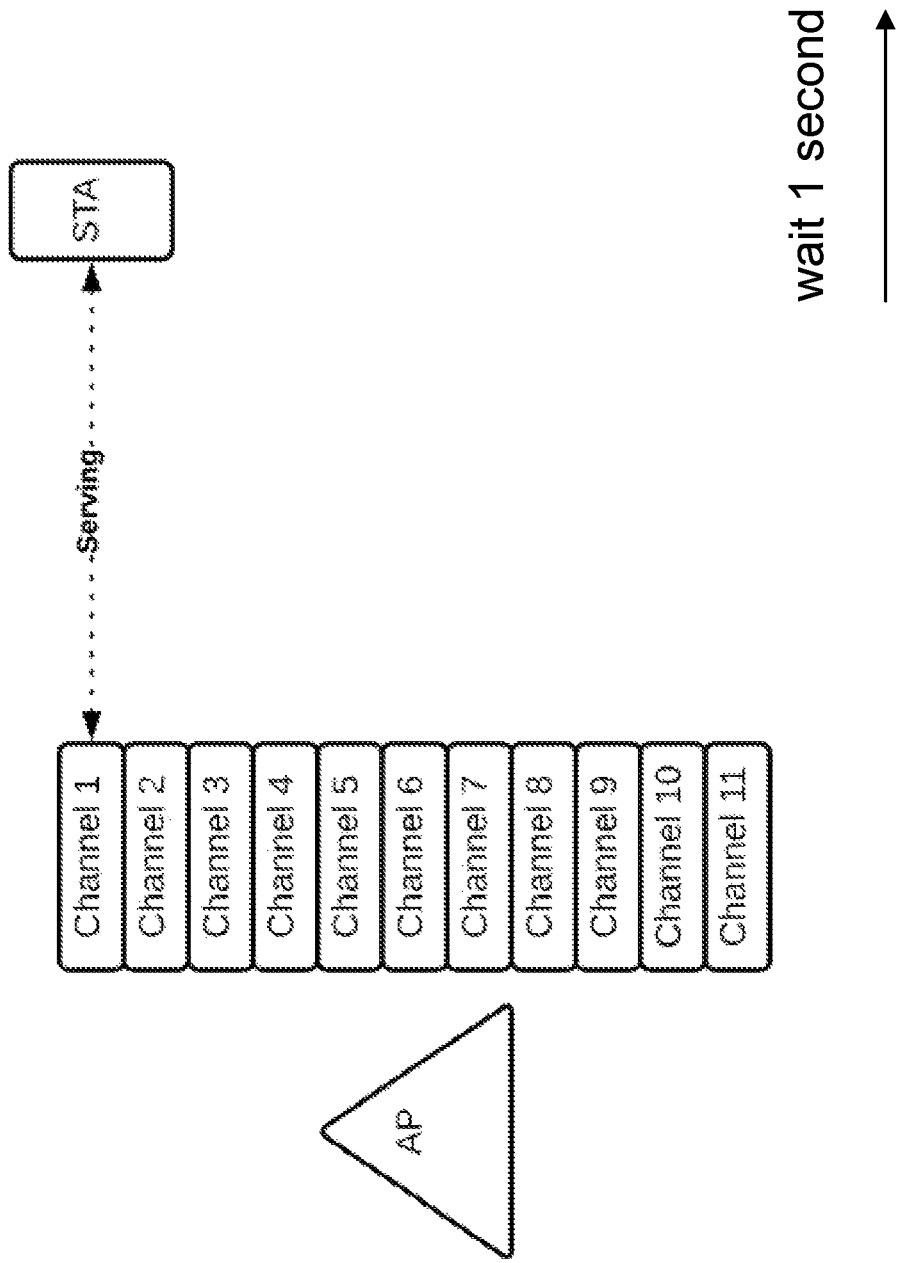
Figure 2D:
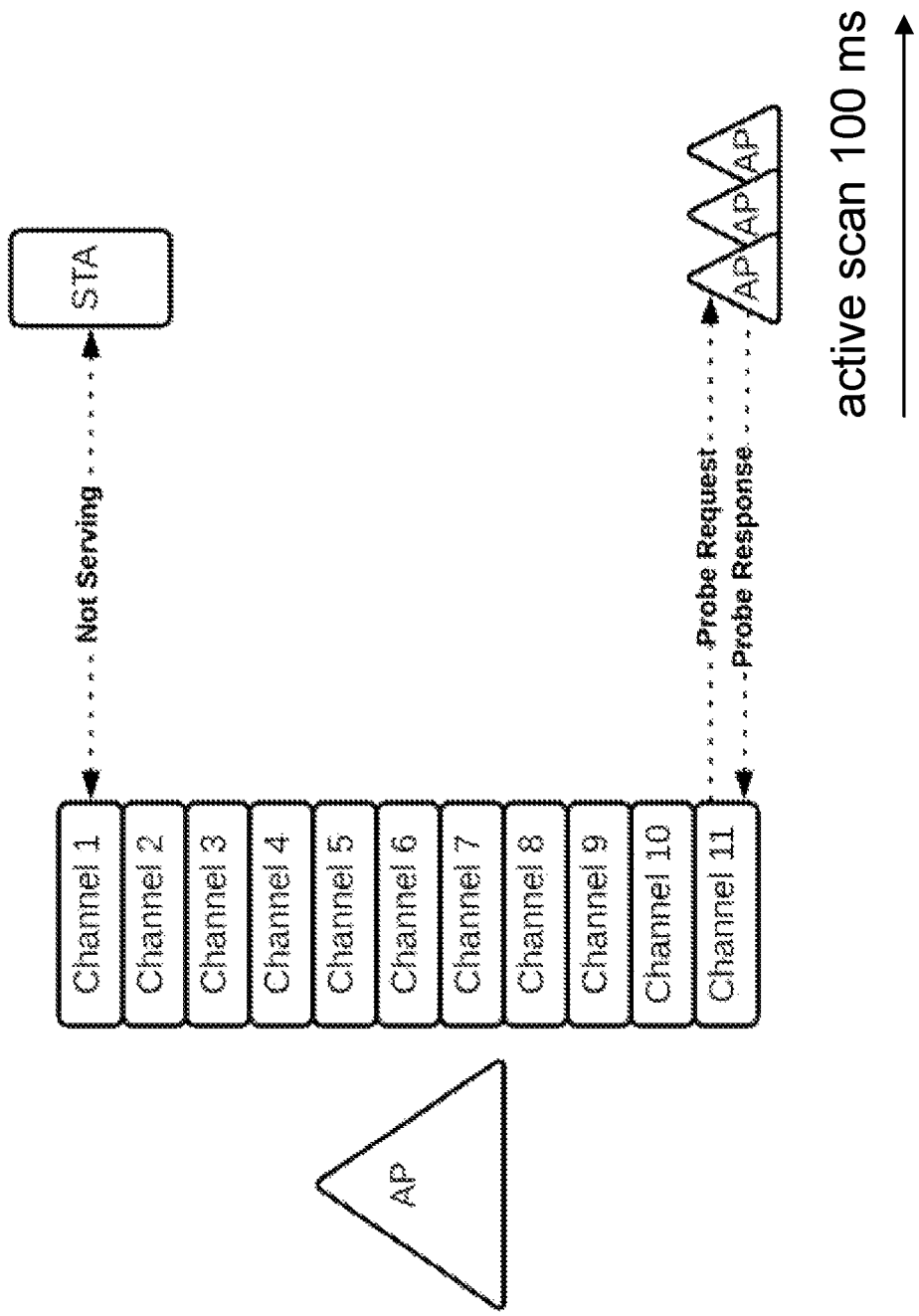
Figure 2E:
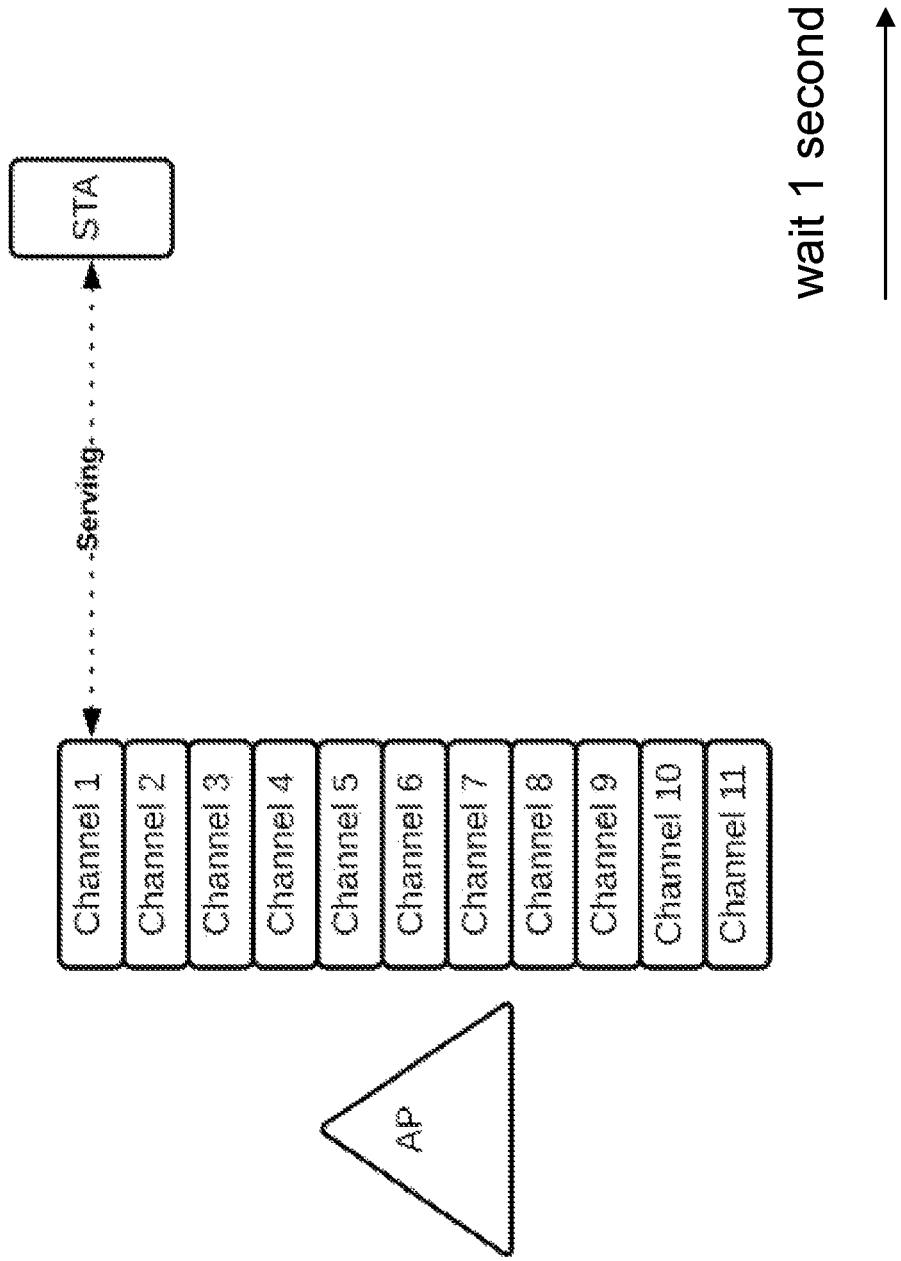

FIGS. 2A-2E are diagrams of active off-channel scanning. In FIG. 2A, the AP is serving the STA on channel 1. After a defined period of time, for example 1 second, the AP switches to a different channel, for example channel 6 as shown in FIG. 2B, to actively scan on that channel. The AP sends request probes or probes and waits to get responses from APs operating on that channel. This can take a defined interval of item, for example 100 milliseconds (100 ms). During the scan time, the AP is not serving the STA on channel 1. After the 100 ms, the AP switches back to the active or serving channel, i.e., to channel 1 as shown in FIG. 2C. After waiting for 1 second, the AP switches to another channel, for example channel 11 as shown in FIG. 2D, to actively scan on that channel. After the 100 ms, the AP switches back to the active or serving channel, i.e., to channel 1 as shown in FIG. 2E. This continues until all of the channels in a channel list are scanned.

Both a passive and an active OCS can report a variety of information in an OCS report, which can be used by the AP and/or the OCS system (collectively "channel selection method") to determine channel quality and which channel to use for serving devices. If a new channel quality is greater than the current channel quality (above a certain threshold to avoid channel pinging) the AP will change channels.

In some implementations, the OCS report can contain the number of APs operating on a channel via beacon or probe response count. Each beacon or probe response can contain a service set identifier (SSID), a basic SSID (BSSID), and an AP count.

In some implementations, in addition to the above information, each beacon or probe response can contain a quality of service (QoS) basis service set (QBSS), which can include a station count, channel utilization, and available admission capacity. The station count refers to the total number of STAs associated with the QBSS. The channel utilization refers to the percentage of time the AP (from which the beacon or probe response was received from) sensed the medium was busy via a physical/virtual carrier sense mechanism (e.g., a number between 0-255). The available admission capacity signals the remaining amount of medium time available using explicit admission control (in units of 32 μs/s).

As noted herein, when the APs perform the OCS, the AP is unable to serve the current devices or clients (these terms are referred to interchangeably) associated with the AP due to the radio being on another channel. For an interval time of 1 second and a dwell time of 100 ms, the AP can spend 10% of the time off the serving channel. Noting that APs can serve tens (10s) of clients at a time, spending 10% of the time off channel decreases overall ecosystem performance. This performance downgrade can be further worsened in times of high traffic, when the AP may not be able to perform the OCS and has to operate on a suboptimal channel until an OCS can be performed.

Described herein are methods and systems for using client assisted off-channel scanning or client assisted OCS. The described methods enable an AP to use stations connected to or in communication with (terms being interchangeable) to perform the OCSs. The reports from the OCSs can be used to assess the spectrum and make decisions accordingly. The stations can be used to perform the OCS and report the information back to the AP as the stations generally have more downtime in contrast to the AP.

In some implementations, the AP knows which stations have low traffic requirements based on pattern of usage, message traffic, and other criteria. In some implementations, the AP can obtain utilization data for each appropriate operating frequency from each of the appropriate stations. The AP can use the utilization data to select which station to use for each operating frequency. The AP can instruct each specific station to perform an OCS on a specific set of channel(s). Through orchestration, the AP can farm out or delegate OCSs intelligently. The AP can aggregate the information gathered from the stations and make well-informed decisions on which channel is optimal for each operating frequency.

The described methods enable the AP to offload the OCS to the station, allowing the AP to focus on serving clients without disruption. This will increase the overall performance of the ecosystem by having the ability to scan the spectrum for the most optimal channels to operate on, without interrupting connectivity on the AP. Depending on implementation, this can free up 10% of the time that would have been spent off channel (based on a scan interval of 1 s and a dwell time of 100 ms).

In some implementations, the described methods enables the AP to signal and use the station to perform specific OCSs to obtain the channel utilization information when the AP is over-utilized. The intelligence of the AP orchestrates which stations will perform scans on which channels to properly assess the spectrum.

Figure 3:
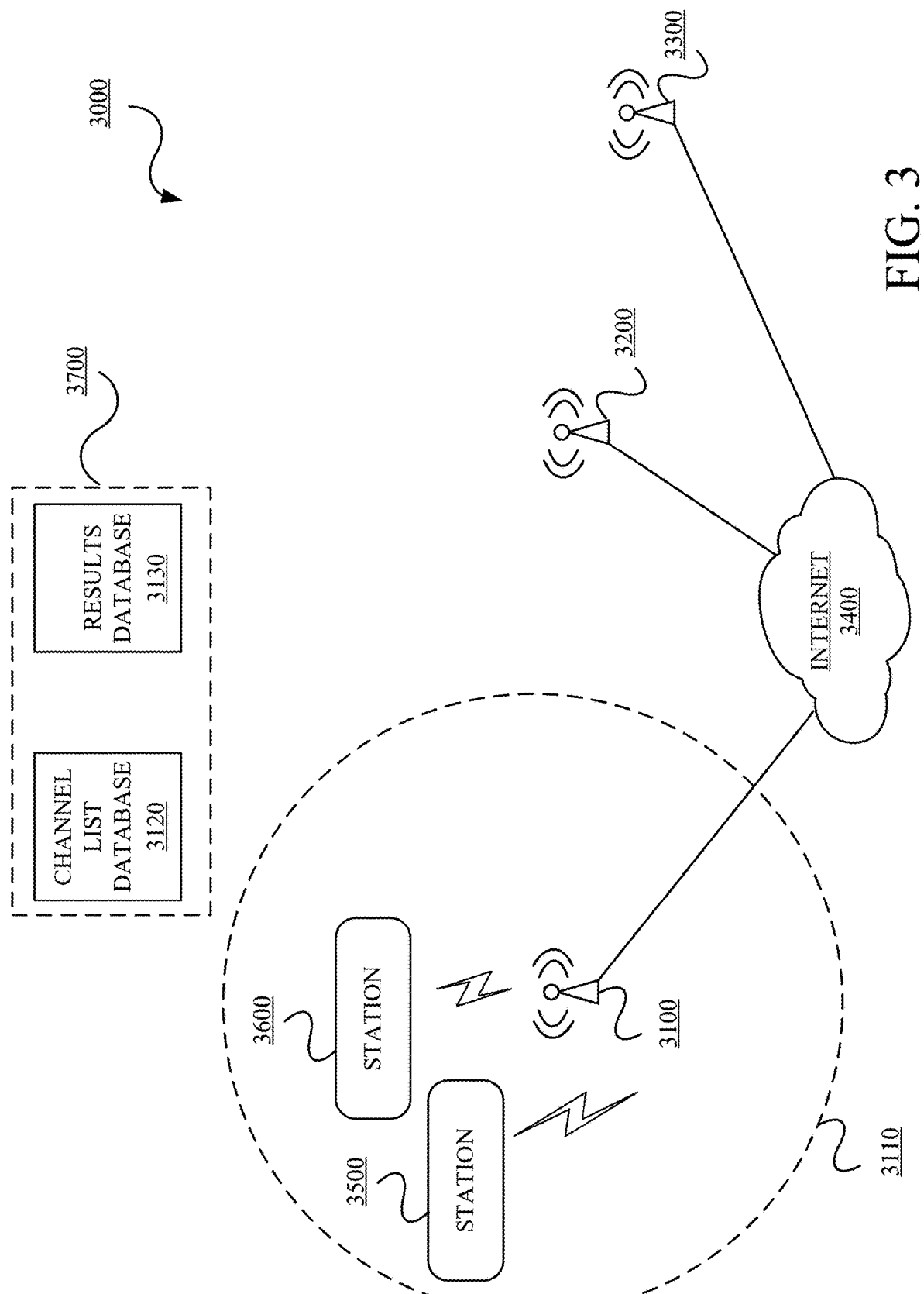
FIG. 3 is a diagram of an example system or network employing client assisted off-channel scanning in accordance with embodiments of this disclosure.

FIG. 3 is a diagram of an example system or network 3000 employing client assisted off-channel scanning in accordance with embodiments of this disclosure. In some implementations, the network 3000 can include an access point 3100, 3200, and 3300. Each of the access points can provide a wireless coverage. For example, the access point 3100 can provide a wireless coverage 3110. Each of the access points 3100, 3200, and 3300 can provide access to an Internet network 3400. Stations 3500 and 3600 can be in communication with the access point 3100. The communications between the access point 3100, the access point 3200, the access point 3300, the station 3500, and the station 3600, as appropriate and applicable, can include wired communications, wireless communications, or a combination thereof. In some implementations, the architecture 3000 may execute the techniques described in FIGS. 4-9 and 11. The architecture 3000 is illustrative and may include additional, fewer, or different devices, entities, and the like which may be similarly or differently architected without departing from the scope of the specification and claims herein. Moreover, the illustrated devices may perform other functions without departing from the scope of the specification and claims herein.

The access point 3100, 3200, and 3300 may be a base station, an access node, a gateway, or like device which enables radio communications access to and from the station 3500 and the station 3600. Each access point 3100, 3200, and 3300 can include OCS software and/or applications to execute the techniques described in FIGS. 4-9 and 11, as appropriate and applicable. In some implementations, each access point 3100, 3200, and 3300 can include one or more databases which includes information related to a channel list for each operating frequency and OCS results or reports from the OCS s. For example, the access point 3100 can include a channel list database 3120 and OCS results database 3130. In some implementations, one or both of the channel list database 3120 and OCS results database 3130 can be deployed or implemented in a cloud platform, such as cloud platform 3700. The cloud platform 3700 can be a service provider system. In some implementations, one or both of the channel list database 3120 and OCS results database 3130 can be deployed or implemented in the cloud platform 3700, the access point 3100, and/or combinations thereof.

The station 3500 and the station 3600 can be, but is not limited to, end user devices, cellular telephones, Internet Protocol (IP) devices, mobile computers, laptops, handheld computers, personal media devices, smartphones, notebooks, notepads, and the like which may include at least one subscriber identity module (SIM) card and at least one radio. In some implementations, the station 3500 and the station 3600 can be dual SIM dual subscriber (DSDS) devices, which can include two (2) SIMs and at least one radio, and where one SIM can be provisioned for operation with a first network and another SIM can be provisioned for operation with a second network. In some implementations, the station 3500 and the station 3600 can be DSDS devices, which can include two (2) SIMs and two radios. The OCS can be performed accordingly in accordance with DSDS operability.

Figure 4:
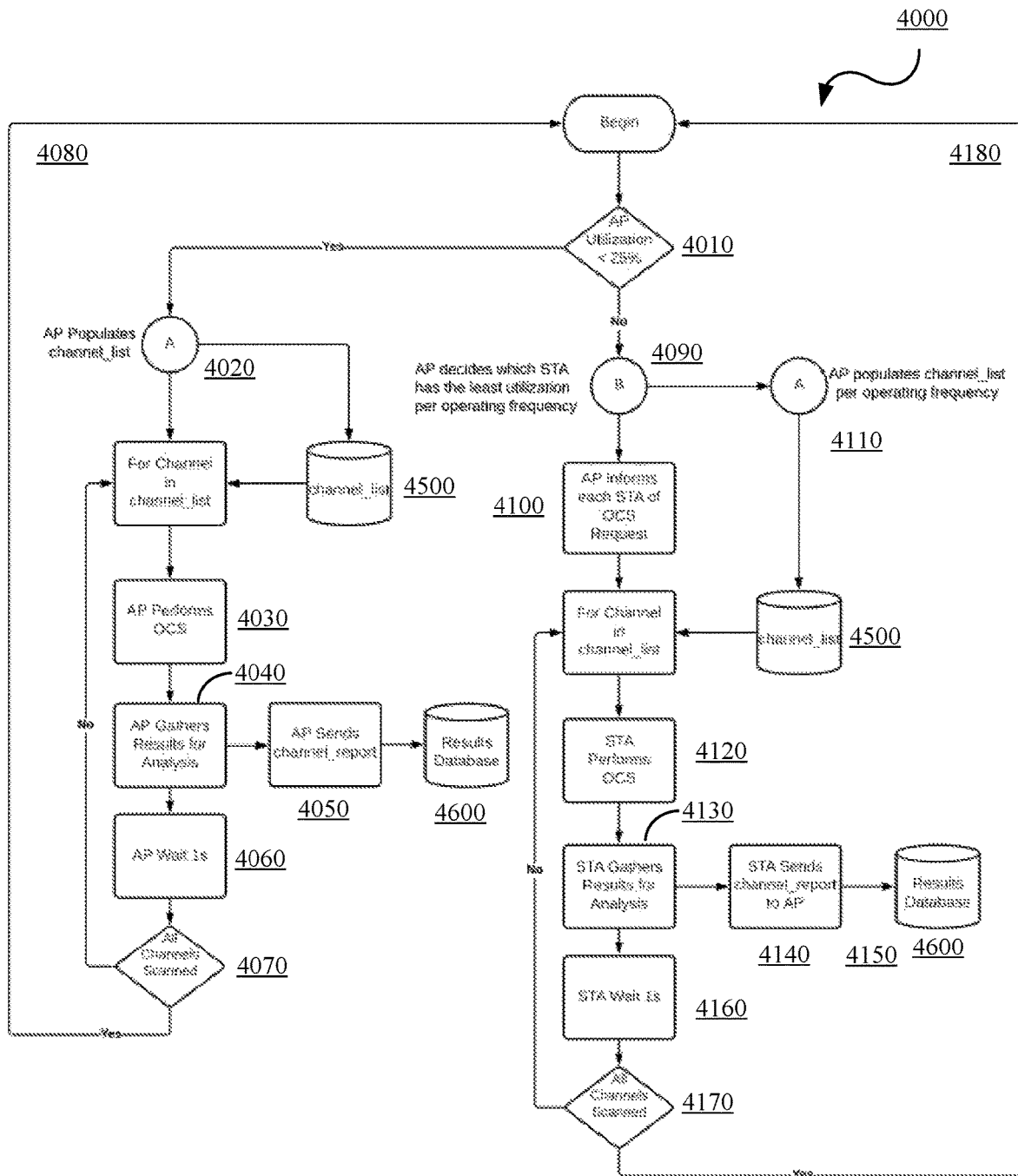
FIG. 4 is an example flow chart of client assisted off-channel scanning in accordance with embodiments of this disclosure.

FIG. 4 is an example flow chart 4000 of client assisted off-channel scanning in accordance with embodiments of this disclosure. The flow chart 4000 can be implemented by the access points, the stations, and the databases as described herein.

The AP can determine whether the AP utilization is below a defined utilization threshold (4010). In some implementations, the defined utilization threshold is 25%. In some implementations, the defined utilization threshold is a configurable threshold. The configurability can depend on usage pattern, traffic pattern, AP type, deployment premise, and other factors. In the event the AP utilization is below the defined utilization threshold, the AP can populate or generate the channel list from a channel list database 4500 (4020). An example channel list is shown in FIG. 8. As described, the channel list will include channels reflecting the operating frequency(ies) supported by the AP. For each channel in the channel list, the AP can switch from a serving channel to perform an OCS (4030). In some implementations, the OCS can be a passive OCS. In some implementations, the OCS can be an active OCS. In some implementations, the OCS type can be dependent on the AP type and/or configuration. The AP can gather the results from the OCS (4040) and send and store an OCS report in a results database 4600 (4050). An example OCS report for channel 1 is illustrated in FIG. 9. The AP can switch back to the serving channel for a defined interval time (4060). In some implementations, the defined interval time is 1 second. The AP can check whether all channels on the channel list have been scanned (4070). If all the channels have been scanned, the AP can execute a channel selection method and start the OCS process again (4080). In some implementations, execution of the channel selection method can occur once all channels have been scanned, after each scan, and/or combinations thereof. In some implementations, execution of the channel selection method can be configurable.

In the event the AP utilization is not below the defined utilization threshold (or exceeds and meets the defined utilization threshold), the AP can determine which stations have lowest utilization for each operating frequency supported by the AP (4090). The AP can inform or notify the selected station(s) to perform an OCS (4100) and can provide or populate the channel list for the selected station(s) from the channel list database 4500 (4110). An example channel list is shown in FIG. 8. As described, the channel list will include channels reflecting the operating frequency(ies) supported by the AP and the selected station. In some implementations, a station can be selected for each operating frequency, a station can be selected for one or more operating frequencies, and/or combinations thereof. For each channel in the channel list, the selected station(s) can switch from a serving channel to perform an OCS (4120). In some implementations, the OCS can be a passive OCS. In some implementations, the OCS can be an active OCS. In some implementations, the OCS type can be dependent on the AP type and/or configuration. The station can gather the results from the OCS (4130) and send an OCS report to the AP (4140), which in turn can save the OCS report in the results database 4600 (4150). An example OCS report for channel 1 is illustrated in FIG. 9. The station can switch back to the serving channel for the defined interval time (4160). The station can check whether all channels on the channel list have been scanned (4170). If all the channels have been scanned, the station can inform the AP, which can execute a channel selection method and start the OCS process again (4180). In some implementations, execution of the channel selection method can occur once all channels have been scanned, after each scan, and/or combinations thereof. In some implementations, execution of the channel selection method can be configurable.

Figure 5:
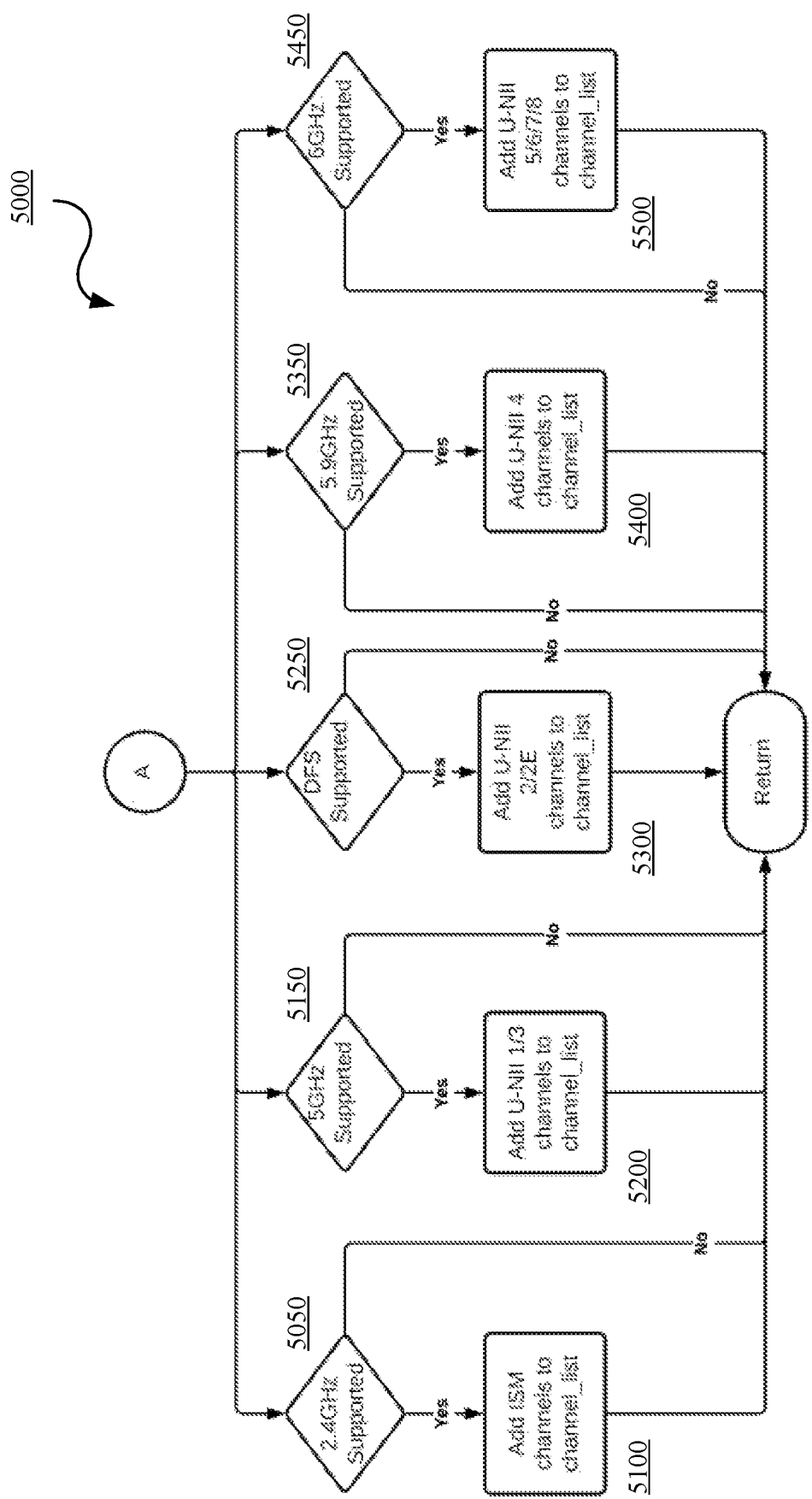
FIG. 5 is an example flow chart of channel list population for the client assisted off-channel scanning method of FIG. 4 in accordance with embodiments of this disclosure.

FIG. 5 is an example flow chart 5000 of channel list population for the client assisted off-channel scanning method of FIG. 4 in accordance with embodiments of this disclosure. The flow chart 5000 is implemented as A in FIG. 4.

As noted, the AP can support one or more operating frequencies. In some implementations, the one or more operating frequencies can include, but is not limited to, a 2.4 GHz operating frequency, a 5 GHz operating frequency, a Dynamic Frequency Selection (DFS) operating frequency (which are 5 GHz Wi-Fi frequencies generally reserved for radar, military radar, satellite communication, and weather radar), a 5.9 GHz operating frequency, and/or a 6 GHz operating frequency.

The AP can determine if it supports the 2.4 GHz operating frequency (5050). If the AP supports the 2.4 GHz operating frequency, then the AP can add the appropriate channels to the channel list (5100). For example, the channels can include the industrial, scientific, and medical radio channels.

The AP can determine if it supports the 5 GHz operating frequency (5150). If the AP supports the 5 GHz operating frequency, then the AP can add the appropriate channels to the channel list (5200). For example, the channels can include the U-NII 1/3 or standard operating channels.

The AP can determine if it supports the DFS operating frequency (5250). If the AP supports the DFS operating frequency, then the AP can add the appropriate channels to the channel list (5300). For example, the channels can include the radar, the military radar, the satellite communication, the weather radar, and/or the U-NII 2/2E channels.

The AP can determine if it supports the 5.9 GHz operating frequency (5350). If the AP supports the 5.9 GHz operating frequency, then the AP can add the appropriate channels to the channel list (5400). For example, the channels can include the U-NII 4 channels.

The AP can determine if it supports the 6 GHz operating frequency (5450). If the AP supports the 5.9 GHz operating frequency, then the AP can add the appropriate channels to the channel list (5500). For example, the channels can include the U-NII 5/6/7/8 channels.

Figure 6:
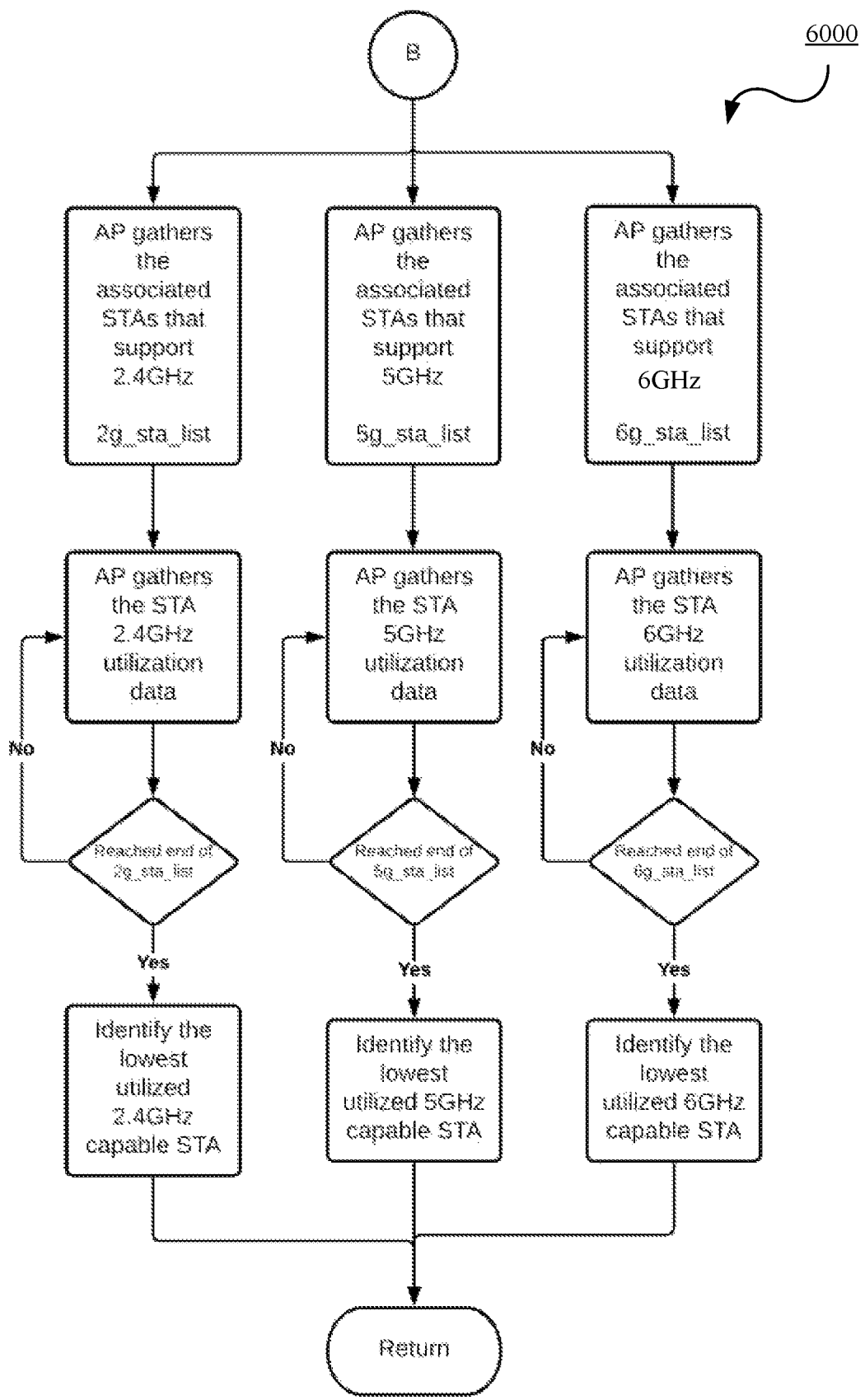
FIG. 6 is an example flow chart of station selection for the client assisted off-channel scanning method of FIG. 4 in accordance with embodiments of this disclosure.

FIG. 6 is an example flow chart 6000 of station selection for the client assisted off-channel scanning method of FIG. 4 in accordance with embodiments of this disclosure. The flow chart 5000 is implemented as B in FIG. 4.

As noted, the AP can support one or more operating frequencies. In some implementations, the one or more operating frequencies can include, but is not limited to, a 2.4 GHz operating frequency, a 5 GHz operating frequency, a Dynamic Frequency Selection (DFS) operating frequency (which are 5 GHz Wi-Fi frequencies generally reserved for radar, military radar, satellite communication, and weather radar), a 5.9 GHz operating frequency, and/or a 6 GHz operating frequency.

If the AP supports the 2.4 GHz operating frequency, the AP can determine and collect the stations that support the 2.4 GHz operating frequency (6100). The AP can collect the 2.4 GHz operating frequency station utilization data for each listed station (6110, 6120). The AP can determine the station with the lowest 2.4 GHz operating frequency station utilization data from the collected information (6130). The selected station will then perform the OCS as outlined in FIG. 5. In some implementations, the AP can determine the station on an on-going basis as the utilization data is collected.

If the AP supports the 5 GHz operating frequency including the DFS operating frequency, the AP can determine and collect the stations that support the 5 GHz operating frequency (6200). The AP can collect the 5 GHz operating frequency station utilization data for each listed station (6210, 6220). The AP can determine the station with the lowest 5 GHz operating frequency station utilization data from the collected information (6230). The selected station will then perform the OCS as outlined in FIG. 5. In some implementations, the AP can determine the station on an on-going basis as the utilization data is collected.

If the AP supports the 6 GHz operating frequency, the AP can determine and collect the stations that support the 6 GHz operating frequency (6300). The AP can collect the 6 GHz operating frequency station utilization data for each listed station (6310, 6320). The AP can determine the station with the lowest 6 GHz operating frequency station utilization data from the collected information (6330). The selected station will then perform the OCS as outlined in FIG. 5. In some implementations, the AP can determine the station on an on-going basis as the utilization data is collected.

Figure 7:
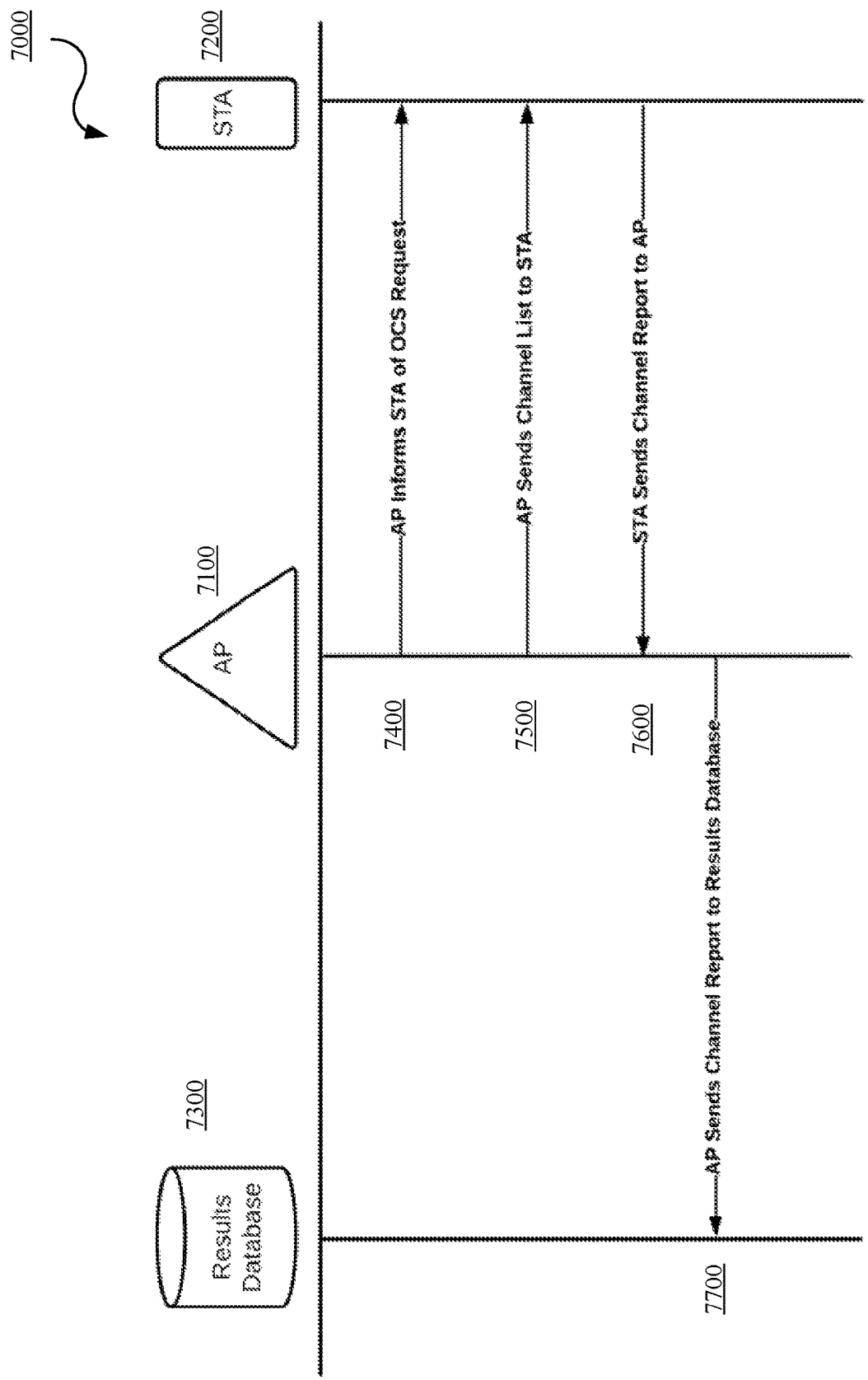
FIG. 7 is an example swim diagram of client assisted off-channel scanning in accordance with embodiments of this disclosure.

FIG. 7 is an example swim diagram 7000 of client assisted off-channel scanning in accordance with embodiments of this disclosure. The swim diagram is operative between an access point (AP) 7100, a station or client (STA) 7200, and a results database 7300.

The AP 7100 can select the STA 7200 using the methods described herein. The AP 7100 can then send an OCS request (7400) and a channel list (7500), where the channel list is populated as described herein. The STA 7200 can perform the OCS on the channels in the channel list and send the data to the AP 7100 (7600). The AP 7100 can store the data in the results database 7300, where the AP 7100 can then execute a channel selection method to determine an optimal serving channel for each operating frequency that the AP 7100 supports.

Figure 10:
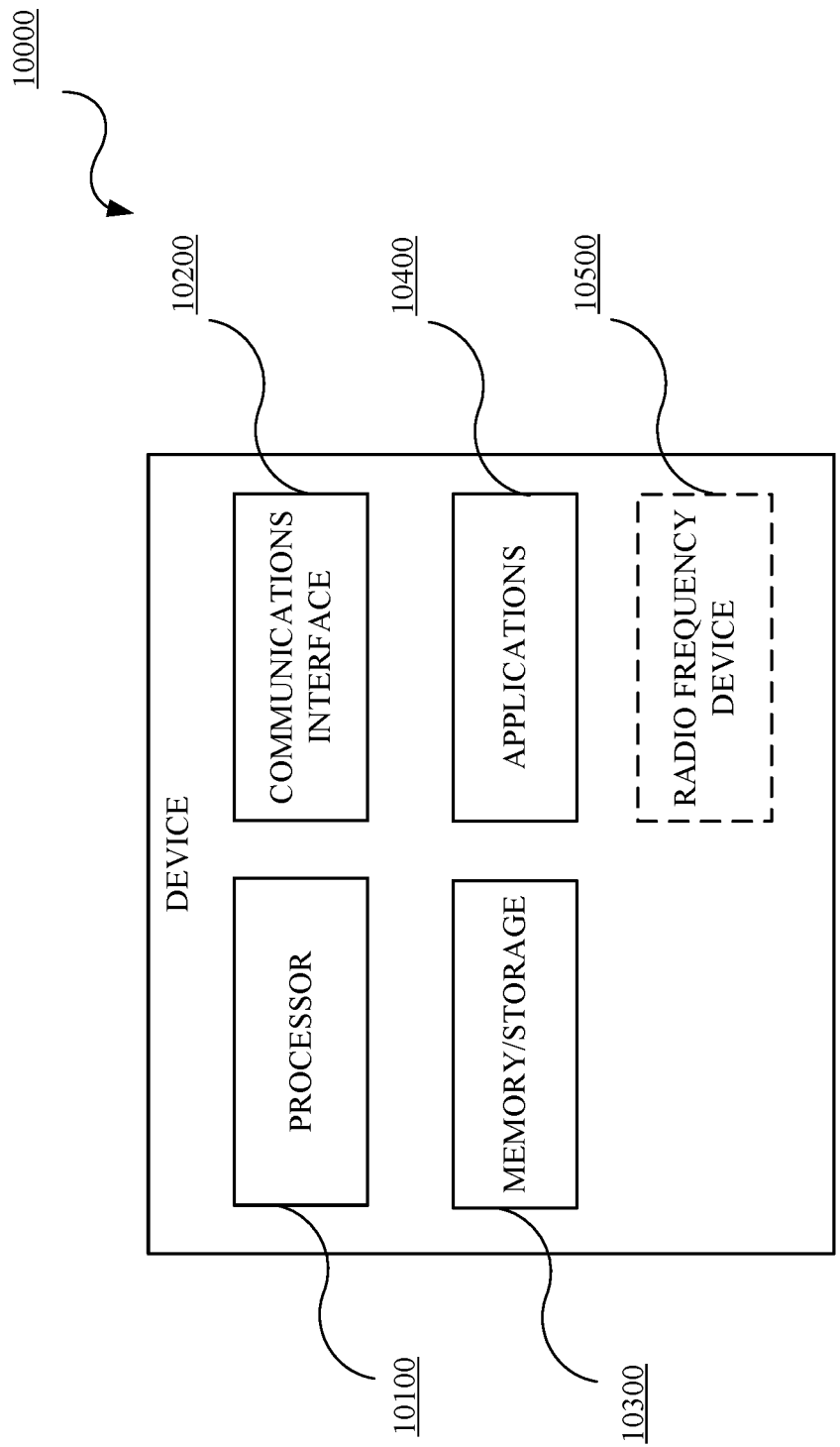
FIG. 10 is a block diagram of an example of a device in accordance with embodiments of this disclosure.

FIG. 10 is a block diagram of an example of a device 10000 in accordance with embodiments of this disclosure. The device 10000 can include, but is not limited to, a processor 10100, a memory/storage 10200, a communication interface 10300, applications 10400, and if applicable, a radio frequency device 10500. The device 10000 may include or implement, for example, any of the access point 3100, the access point 3200, the access point 3300, the station 3500, the station 3600, the access point 7100, and the station 7200. The memory/storage 10200 may include or implement, for example, the channel list database 3120, the OCS results database 3130, and the results database 7300. The applicable or appropriate techniques or methods described herein may be stored in the memory/storage 10200 and executed by the processor 10100 in cooperation with the memory/storage 10200, the communications interface 10300, the applications 10400, and the radio frequency device 10500, as appropriate. The device 10000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 11:
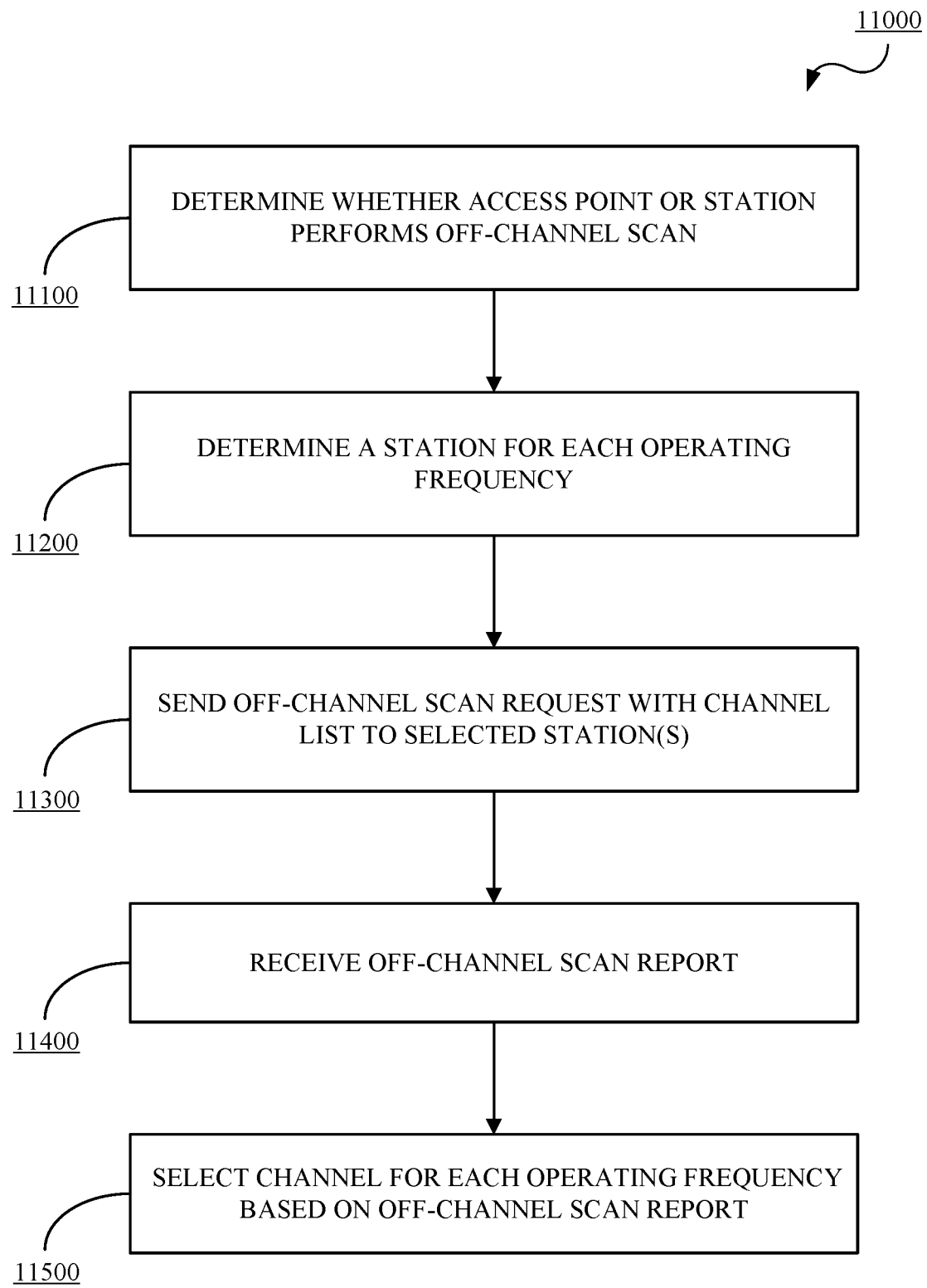
FIG. 11 is a flowchart of an example method of client assisted off-channel scanning in accordance with embodiments of this disclosure.

FIG. 11 is a flowchart of an example method 11000 for performing client assisted off-channel scans in accordance with embodiments of this disclosure. The method 11000 includes: determining 11100 whether an access point or station performs an off-channel scan; determining 11200 a station for each operating frequency; sending 11300 an off-channel scan request with a channel list to selected station(s); receiving 11400 off-channel scan report from the station(s); and selecting 11500 a channel for each operating frequency based on off-channel scan report. For example, the method 11000 can be implemented, as applicable and appropriate, by or in the network 3000, the access points 3100, 3200, 3300, and 7100, the stations 3500, 3600, and 7200, the channel list database 3120 and 4500, the OCS results database 3130 and 4600, the results database 7300, the device 10000, the processor 10100, the memory/storage 10200, the communication interface 10300, the applications 10400, and the radio frequency device 10500, as appropriate and applicable.

The method 11000 includes determining 11100 whether an access point or station performs an off-channel scan. The access point can determine based on one or more metrics whether the access point or a station(s) should perform the OCS. In some implementations, the one or more metrics can include, but is not limited to, utilization, connected device density, and/or usage pattern. In some implementations, threshold(s) associated with the one or more metrics are configurable. The configurability can be based, but is not limited to, performance, utilization, and/or deployment premises.

The method 11000 includes determining 11200 a station for each operating frequency. In the event the station is to perform the OCS, the access point can identify stations (which are connected to the access point) that support each of the operating frequencies supported by the access point. The access point can collect utilization data from each station for each access point operating frequency supported by the station. The access point can select a station for each access point operating frequency based on the lowest utilization data.

The method 11000 includes sending 11300 an off-channel scan request with a channel list to selected station(s). The access point can send a request with a channel list to each selected station. In some implementations, the selected station can be one or more selected stations. The channel list reflects the access point operating frequency(ies) supported by the selected station(s). Each operating frequency is represented by a range of frequencies and a channel is a portion of the relevant operating frequency range. The channels in an operating frequency can be stored in a channel list database accessible by the access point.

The method 11000 includes receiving 11400 off-channel scan report from the station(s). The selected station(s) can perform the OCS and report back the data to the access point. The data can include, but is not limited to, a service set identifier (SSID), a basic SSID (BSSID), an access point count, a station count, a channel utilization, an available admission capacity, and/or combinations thereof. The access point can store each OCS report (the data from the station) in a results database.

The method 11000 includes selecting 11500 a channel for each operating frequency based on off-channel scan report. The access point can use one or more channel selection methods to select an optimal channel for each operating frequency to service devices or clients (a serving or servicing channel). In some implementations, the channel selection can be done once OCS reports are received for each channel in the channel list. In some implementations, the channel selection can be done on an on-going basis as OCS reports are received by comparing to a current serving channel. A switch to a new serving channel can be done once the channel list is completed. In some implementations, the switch can occur if a metric is at least a defined value or percentage better than the current serving channel.

The described methods and systems for using client assisted off-channel scanning can include, but is not limited to, a method for off-channel scanning. In some implementations, the method includes determining, by an access point, whether the access point or station performs an off-channel scan, selecting, by the access point, a station for each operating frequency supported by the access point when the access point is unable to perform the off-channel scan, sending, by the access point to each selected station, an off-channel scan request with a channel list, receiving, by the access point from each selected station, off-channel scan data, and selecting, by the access point, a serving channel for each operating frequency based on the off-channel scan data.

In some implementations, the method further includes comparing, by the access point, an access point utilization against a defined utilization threshold, and determining, by the access point, that the access point is unable to perform the off-channel scan when the access point utilization meets or exceeds the defined utilization threshold. In some implementations, the selecting further includes identifying, by the access point, one or more stations which support one or more of the operating frequencies supported by the access point, and determining, by the access point, a least utilized station for each of the one or more of the operating frequencies supported by the access point. In some implementations, the selecting further includes determining, by the access point, a least utilized station from station utilization data for each operating frequency supported by the access point. In some implementations, the sending further includes populating, by the access point, the channel list for each selected station from a channel database based on an associated operating frequency. In some implementations, the method further includes storing, by the access point, the off-channel scan data in a results database. In some implementations, the method further includes applying, by the access point, a channel selection technique to the stored off-channel scan data to select the serving channel for each operating frequency. In some implementations, the method further includes switching, by the access point, from a current serving channel to the serving channel when a defined threshold is exceeded. In some implementations, the off-channel scan data includes at least one of a service set identifier (SSID), a basic SSID, an access point count, a station count, a channel utilization, or an available admission capacity. In some implementations, the method further includes performing, by the access point, the off-channel scan when access point utilization is below a defined utilization threshold.

The described methods and systems for using client assisted off-channel scanning can include, but is not limited to, an access point. In some implementations, the access point includes at least one radio, a memory, and a processor operating with the at least one radio and the memory. The processor configured to identify which connected devices support which access point operating frequency, for each access point operating frequency, determine a least utilized connected device from the identified connected devices, for each access point operating frequency, request each determined connected device to perform an off-channel scan using a defined set of channels, and for each access point operating frequency, determine whether to switch from a current device serving channel to a scanned channel based on off-channel scan results sent by each determined connected device.

In some implementations, the processor is further configured to determine whether the access point or at least one connected device performs the off-channel scan based on comparing an operational metric of the access point to a defined threshold. In some implementations, the operational metric is utilization data. In some implementations, the processor is further configured to collect utilization data from each identified connected device to determine the least utilized connected device for each access point operating frequency. In some implementations, the processor is further configured to generate a channel list for each identified connected device using a database which contains channels for each access point operating frequency. In some implementations, the processor is further configured to, for each access point operating frequency, use an optimal channel algorithm to determine whether to switch from the current device serving channel to the scanned channel.

The described methods and systems for using client assisted off-channel scanning can include, but is not limited to, a method for assisted off-channel scanning. In some implementations, the method includes determining, by an access device, to offload performance of an off-channel scan when an operational metric of the access device meets or exceeds a defined threshold, collecting, by the access device, which client devices support operational frequencies configured on the access device, determining, by the access device, from the collected client devices, a least unoccupied client device for each operational frequency configured on the access device, requesting, by the access device, each least unoccupied client device to perform the off-channel scan using a channel list, and using, by the access device, off-channel scan results from each least unoccupied client device to determine whether to, for each operational frequency, switch from a current operational channel to a scanned channel.

In some implementations, the method further includes using, by the access device, operational data from each collected client device to determine the least unoccupied client device for each operational frequency configured on the access device. In some implementations, the method further includes determining, by the access device, to perform the off-channel scan when an operational metric of the access device is below the defined threshold. In some implementations, the method further includes determining, by the access device, the channel list for each collected client device based on whether the collected client device is the least unoccupied client device for an operational frequency.

The described methods and systems for using client assisted off-channel scanning can include, but is not limited to, a method for off-channel scanning. In some implementations, the method includes determining, by an access point, whether the access point or one or more stations perform an off-channel scan, selecting, by the access point, a station from the one or more stations for each operating frequency supported by the access point when the access point is unable to perform the off-channel scan, sending, by the access point to each selected station, an off-channel scan request with a channel list, receiving, by the access point from each selected station, off-channel scan data, and selecting, by the access point, a serving channel for each operating frequency based on the off-channel scan data.

In some implementations, the determining further includes comparing, by the access point, an access point utilization against a defined utilization threshold, and determining, by the access point, that the access point is unable to perform the off-channel scan when the access point utilization meets or exceeds the defined utilization threshold. In some implementations, the selecting further includes identifying, by the access point, at least one station from the one or more stations which supports one or more of the operating frequencies supported by the access point, and determining, by the access point, a least utilized station from at least one identified station for each of the one or more operating frequencies supported by the access point. In some implementations, the selecting further includes determining, by the access point, a least utilized station from station utilization data for each operating frequency supported by the access point, the least utilized station determined from the one or more stations. In some implementations, the sending further includes populating, by the access point, the channel list for each selected station from a channel database based on an associated operating frequency. In some implementations, the method further includes storing, by the access point, the off-channel scan data in a results database. In some implementations, the method further includes applying, by the access point, a channel selection technique to the stored off-channel scan data to select the serving channel for each operating frequency. In some implementations, the selecting further includes switching, by the access point, from a current serving channel to the serving channel when a defined threshold is exceeded. In some implementations, the off-channel scan data includes at least one of a service set identifier (SSID), a basic SSID, an access point count, a station count, a channel utilization, or an available admission capacity. In some implementations, the method further includes performing, by the access point, the off-channel scan when access point utilization is below a defined utilization threshold.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for off-channel scanning, the method comprising:
   determining, by an access point, which of the access point or one or more stations to perform an off-channel scan;
   identifying, by the access point, at least one station from the one or more stations to perform the off-channel scan for each operating frequency supported by the access point when the access point is unable to perform the off-channel scan;
   selecting, by the access point, a least utilized station from identified stations to perform the off-channel scan for each of the one or more operating frequencies supported by the access point;
   sending, by the access point to each selected station, an off-channel scan request to perform the off-channel scan, the off-channel scan request including a channel list;
   receiving, by the access point from each selected station, off-channel scan data after the each selected station has performed the off-channel scan; and
   selecting, by the access point, a serving channel for each operating frequency based on the off-channel scan data.

2. The method of claim 1, the determining further comprising:
   comparing, by the access point, an access point utilization against a defined utilization threshold; and
   determining, by the access point, that the access point is unable to perform the off-channel scan when the access point utilization meets or exceeds the defined utilization threshold.

3. The method of claim 1, the selecting further comprising:
   determining, by the access point, a least utilized station from station utilization data for each operating frequency supported by the access point, the least utilized station determined from the one or more stations.

4. The method of claim 1, the sending further comprising:
   populating, by the access point, the channel list for each selected station from a channel database based on an associated operating frequency.

5. The method of claim 1, the method further comprising:
   storing, by the access point, the off-channel scan data in a results database.

6. The method of claim 5, the method further comprising:
   applying, by the access point, a channel selection technique to the stored off-channel scan data to select the serving channel for each operating frequency.

7. The method of claim 6, the method further comprising:
   switching, by the access point, from a current serving channel to the serving channel when a defined threshold is exceeded.

8. The method of claim 1, wherein the off-channel scan data includes at least one of a service set identifier (SSID), a basic SSID, an access point count, a station count, a channel utilization, or an available admission capacity.

9. The method of claim 1, the method further comprising:
   performing, by the access point, the off-channel scan when access point utilization is below a defined utilization threshold.

10. An access point, comprising:
    at least one radio;
    a memory; and
    a processor operating with the at least one radio and the memory, the processor configured to:
    identify which client connected devices support which access point operating frequency when the access point is unable to perform an off-channel scan;
    for each access point operating frequency, determine a least utilized connected client device from the identified client connected devices to perform the off-channel scan;
    for each access point operating frequency, request each determined connected client device to perform the off-channel scan using a defined set of channels; and
    for each access point operating frequency, determine whether to switch from a current client device serving channel to a scanned channel based on off-channel scan results sent by each determined connected client device after the each determined connected client device has performed the off-channel scan.

11. The access point of claim 10, the processor further configured to:
    determine whether the access point or at least one connected client device performs the off-channel scan based on comparing an operational metric of the access point to a defined threshold.

12. The access point of claim 11, wherein the operational metric is utilization data.

13. The access point of claim 10, the processor further configured to:
    collect utilization data from each identified connected client device to determine the least utilized connected client device for each access point operating frequency.

14. The access point of claim 10, the processor further configured to:

generate a channel list for each identified connected client device using a database which contains channels for each access point operating frequency.

15. The access point of claim 10, the processor further configured to:
for each access point operating frequency, use an optimal channel algorithm to determine whether to switch from the current client device serving channel to the scanned channel.

16. A method for performing assisted off-channel scanning, the method comprising:
determining, by an access device, to offload performance of an off-channel scan when an operational metric of the access device meets or exceeds a defined threshold;
collecting, by the access device, which client devices support operational frequencies configured on the access device;
determining, by the access device, from the collected client devices, a least unoccupied client device to perform the off-channel scan for each operational frequency configured on the access device when the operational metric of the access device meets or exceeds the defined threshold;
requesting, by the access device, each least unoccupied client device to perform the off-channel scan using a channel list; and
using, by the access device, off-channel scan results from each least unoccupied client device after the each least unoccupied client device has performed the off-channel scan to determine whether to, for each operational frequency, switch from a current operational channel to a scanned channel.

17. The method of claim 16, the method further comprising:
using, by the access device, operational data from each collected client device to determine the least unoccupied client device for each operational frequency configured on the access device.

18. The method of claim 16, the method further comprising:
determining, by the access device, to perform the off-channel scan when an operational metric of the access device is below the defined threshold.

19. The method of claim 16, the method further comprising:
determining, by the access device, the channel list for each collected client device based on whether the collected client device is the least unoccupied client device for an operational frequency.

* * * * *